US012560125B2

(12) United States Patent
Miller et al.

(10) Patent No.: US 12,560,125 B2
(45) Date of Patent: **\*Feb. 24, 2026**

(54) GAS TURBINE ENGINE WITH ACOUSTIC SPACING OF THE FAN BLADES AND OUTLET GUIDE VANES

(71) Applicant: General Electric Company, Evendale, OH (US)

(72) Inventors: Brandon Wayne Miller, Evendale, OH (US); Egbert Geertsema, Evendale, OH (US); Arthur W. Sibbach, Boxford, MA (US); Andrew Hudecki, Evendale, OH (US); Timothy Richard DePuy, Evendale, OH (US); John C. Schilling, Evendale, OH (US); Frank Worthoff, Evendale, OH (US); Tsuguji Nakano, Evendale, OH (US)

(73) Assignee: General Electric Company, Evendale, OH (US)

( \* ) Notice: Subject to any disclaimer, the term of this patent is extended or adjusted under 35 U.S.C. 154(b) by 0 days.

This patent is subject to a terminal disclaimer.

(21) Appl. No.: 19/177,403

(22) Filed: Apr. 11, 2025

(65) Prior Publication Data

US 2025/0382915 A1 Dec. 18, 2025

Related U.S. Application Data

(63) Continuation-in-part of application No. 18/744,069, filed on Jun. 14, 2024, now Pat. No. 12,292,017.

(51) Int. Cl.
| | |
|---|---|
| *F02C 7/24* | (2006.01) |
| *F02C 7/36* | (2006.01) |
| *F02K 3/06* | (2006.01) |

(52) U.S. Cl.
CPC .................. *F02C 7/24* (2013.01); *F02C 7/36* (2013.01); *F02K 3/06* (2013.01); *F05D 2260/40311* (2013.01); *F05D 2260/961* (2013.01)

(58) Field of Classification Search
CPC .... F02K 3/06; F02C 7/045; F02C 7/24; F04D 29/666; F05D 2220/36; F05D 2240/12; F05D 2260/96; F05D 2300/603
See application file for complete search history.

(56) References Cited

U.S. PATENT DOCUMENTS

| | | | |
|---|---|---|---|
| 1,201,289 A | 10/1916 | Halladay | |
| 3,505,819 A | 4/1970 | Wilde | |

(Continued)

FOREIGN PATENT DOCUMENTS

| | | | |
|---|---|---|---|
| CN | 105177492 A | 12/2015 | |
| CN | 105697730 A | 6/2016 | |

(Continued)

OTHER PUBLICATIONS

Anderson et al., "Advanced Gearbox Technology Final Report," Allison Gas Turbine Division, General Motors Corporation, NASA CR-179625 (Aug. 1984-Jan. 1987) (156 pages).

(Continued)

*Primary Examiner* — Brian Christopher Delrue
(74) *Attorney, Agent, or Firm* — Klarquist Sparkman, LLP

(57) ABSTRACT

A gas turbine engine comprises a fan, a core turbine engine coupled to the fan, a fan case housing the fan and the core turbine engine, a plurality of outlet guide vanes extending between the core turbine engine and the fan case, and an acoustic spacing. The fan comprises a plurality of fan blades that define a fan diameter and a BEAL. The fan case comprises an inlet and an inlet length between the inlet and (Continued)

the fan. The acoustic spacing comprises a distance between the fan and the plurality of outlet guide vanes, and in combination with the BEAL determines an acoustic spacing ratio of the gas turbine engine. A gearbox assembly with improved engine efficiency rating used in combination with the acoustic spacing provides an improved and balanced engine architecture.

20 Claims, 23 Drawing Sheets

(56) References Cited

U.S. PATENT DOCUMENTS

| | | |
|---|---|---|
| 3,534,556 A | 10/1970 | Wilde |
| 5,169,288 A | 12/1992 | Gliebe et al. |
| 5,299,914 A | 4/1994 | Schilling |
| 6,195,983 B1 | 3/2001 | Wadia et al. |
| 7,118,331 B2 | 10/2006 | Shahpar |
| 7,374,403 B2 | 5/2008 | Decker et al. |
| 7,374,404 B2 | 5/2008 | Schilling et al. |
| 9,228,535 B2 | 1/2016 | Magowan |
| 9,540,938 B2 | 1/2017 | Topol et al. |
| 10,060,357 B2 | 8/2018 | Adams et al. |
| 10,107,191 B2 | 10/2018 | Gilson et al. |
| 10,247,018 B2 | 4/2019 | Topol et al. |
| 10,458,426 B2 | 10/2019 | Wilkin, II |
| 10,584,632 B1 | 3/2020 | Kannangara et al. |
| 10,626,490 B2 | 4/2020 | Heuer et al. |
| 10,634,233 B1 | 4/2020 | Smith |
| 10,641,182 B1 | 5/2020 | Bemment |
| 10,677,264 B2 * | 6/2020 | Moniz .................... F04D 29/324 |
| 10,711,797 B2 | 7/2020 | Kroger et al. |
| 10,815,886 B2 | 10/2020 | Kroger et al. |
| 11,022,044 B1 | 6/2021 | Spruce |
| 11,125,155 B2 | 9/2021 | Kupratis et al. |
| 11,162,431 B2 | 11/2021 | Spruce |
| 11,199,196 B2 | 12/2021 | Breen |
| 11,377,958 B2 | 7/2022 | Lemarchand et al. |
| 11,408,355 B2 | 8/2022 | Hrubec et al. |
| 11,466,624 B1 | 10/2022 | Piazza et al. |
| 11,473,507 B2 | 10/2022 | Molesini et al. |
| 11,486,312 B2 | 11/2022 | Molesini et al. |
| 11,713,721 B1 | 8/2023 | Piazza et al. |
| 11,994,072 B1 | 5/2024 | Bemment et al. |
| 12,012,898 B2 * | 6/2024 | Miller ........................ F02K 3/06 |
| 12,085,025 B2 | 9/2024 | Hasel et al. |
| 12,116,938 B2 | 10/2024 | Spruce |
| 12,292,017 B1 * | 5/2025 | Miller ........................ F02C 7/24 |
| 2006/0228206 A1 | 10/2006 | Decker et al. |
| 2008/0283676 A1 | 11/2008 | Jain et al. |
| 2009/0082976 A1 | 3/2009 | Anuzis et al. |
| 2011/0056183 A1 | 3/2011 | Sankrithi et al. |
| 2012/0288358 A1 | 11/2012 | Balk |
| 2014/0140824 A1 | 5/2014 | Sheridan |
| 2014/0161591 A1 | 6/2014 | Venter |
| 2014/0227084 A1 | 8/2014 | Sheridan |
| 2014/0283500 A1 | 9/2014 | Sabnis |
| 2014/0363276 A1 | 12/2014 | Vetters et al. |
| 2015/0044028 A1 | 2/2015 | Lord et al. |
| 2016/0208651 A1 | 7/2016 | Dolman et al. |
| 2016/0215729 A1 | 7/2016 | Sabnis |
| 2016/0363137 A1 | 12/2016 | Topol et al. |
| 2017/0022820 A1 | 1/2017 | Joseph et al. |
| 2017/0184053 A1 | 6/2017 | Harvey et al. |
| 2017/0298954 A1 * | 10/2017 | Qiu ........................ F04D 29/547 |
| 2017/0314562 A1 | 11/2017 | Rose |
| 2018/0030926 A1 | 2/2018 | Eckett et al. |
| 2018/0106274 A1 | 4/2018 | Moniz et al. |
| 2018/0135557 A1 | 5/2018 | Pouyau et al. |
| 2018/0195465 A1 | 7/2018 | Bruhat |
| 2018/0252166 A1 | 9/2018 | Pointon |
| 2018/0258794 A1 | 9/2018 | Gedin et al. |
| 2018/0259005 A1 | 9/2018 | Nikola et al. |
| 2018/0274443 A1 | 9/2018 | Pointon et al. |
| 2018/0363123 A1 | 12/2018 | Lapierre et al. |
| 2019/0128123 A1 | 5/2019 | Paruchuri et al. |
| 2019/0170240 A1 | 6/2019 | Charrier et al. |
| 2019/0292944 A1 | 9/2019 | Mason et al. |
| 2019/0360578 A1 | 11/2019 | Chevillot et al. |
| 2019/0376529 A1 | 12/2019 | Joseph et al. |
| 2020/0032716 A1 | 1/2020 | Di Giovanni et al. |
| 2020/0132186 A1 | 4/2020 | Dombek et al. |
| 2020/0166121 A1 | 5/2020 | Di Giovanni et al. |
| 2020/0208577 A1 | 7/2020 | Di Giovanni et al. |
| 2020/0277901 A1 | 9/2020 | Bemment |
| 2020/0347785 A1 | 11/2020 | Morin et al. |
| 2020/0400069 A1 | 12/2020 | Aguilera et al. |
| 2021/0108572 A1 | 4/2021 | Khalid et al. |
| 2021/0222563 A1 | 7/2021 | Mohankumar et al. |
| 2022/0042461 A1 * | 2/2022 | Molesini ................... F02C 7/06 |
| 2022/0042462 A1 | 2/2022 | Molesini et al. |
| 2022/0042463 A1 | 2/2022 | Molesini et al. |
| 2022/0042464 A1 | 2/2022 | Molesini et al. |
| 2022/0049621 A1 | 2/2022 | Sawyers-Abbott et al. |
| 2022/0049656 A1 | 2/2022 | Sawyers-Abbott et al. |
| 2022/0056811 A1 | 2/2022 | Molesini et al. |
| 2023/0151777 A1 | 5/2023 | Bifulco et al. |
| 2024/0151185 A1 * | 5/2024 | Miller ........................ F02K 3/06 |
| 2024/0318614 A1 * | 9/2024 | Mondal ..................... F02C 3/06 |

FOREIGN PATENT DOCUMENTS

| | | |
|---|---|---|
| CN | 110791728 A | 2/2020 |
| CN | 112796884 A | 5/2021 |
| EP | 2 360 391 A1 | 8/2011 |
| EP | 3 372 808 A2 | 9/2018 |
| EP | 3 543 476 A1 | 9/2019 |
| EP | 3 591 191 A1 | 1/2020 |
| EP | 3 670 871 A1 | 6/2020 |
| EP | 3 085 897 B1 | 9/2021 |
| FR | 2991694 B1 | 8/2015 |
| JP | 2006037979 A | 2/2006 |
| WO | WO 2014/066503 A1 | 5/2014 |
| WO | WO 2014/170566 A1 | 10/2014 |
| WO | WO 2019/016491 A1 | 1/2019 |

OTHER PUBLICATIONS

Gliebe et al., *Ultra-High Bypass Engine Aeroacoustic Study.* No. NASA/CR-2003-212525, 2003.

Hart, K. Basic Architecture and Sizing of Commercial Aircraft Gas Turbine Oil Feed Systems. Proceedings of ASME Turbo Expo 2008. Jun. 9-13, 2008. (Year: 2008).

Hendricks et al., "Performance and Weight Estimates for an advanced Open Rotor Engine," Prepared for the 48th Joint Propulsion Conf and Exhibit cosponsored by the AIAA, ASME, SAE and ASEE, Atlanta, GA, NASA/TM—2012-217710, AIAA-2012-3911 (Sep. 2012) (20 pages).

Machine Design. Spur versus planetary gearheads for de servomotors. Accessed from https://www.machinedesign.com/archive/article/21813332/spur-versus-planetary-gearheads-for-dc-servomotors (Year: 2000).

Max Power. Know Which Gear is More Efficient. accessed from http://maxpowergears.com/know-gear-efficient/ (Year: 2017).

Ultrafan: The Ultimate TurboFan. Rolls-Royce PLC, 2022. www.rolls-royce.com/-/media/Files/R/Rolls-Royce/documents/innovation/ ultrafan-fact-sheet.pdf. (Year: 2022).

* cited by examiner

| Engine | As (259) | c (210) chord length | rr radius ratio | S span | Nb | Nv/Nb | γ stagger angle | BEAL | ASR | FBD |
|---|---|---|---|---|---|---|---|---|---|---|
| #1 | 20.0 | 27 | 0.350 | 25.0 | 16 | 2.6 | 33 | 4.70 | 1.62 | 76.9(#1) |
| #2 | 3.0 | 10 | 0.350 | 24.0 | 20 | 3.0 | 30 | 0.56 | 1.80 | 73.8(#1) |
| #3 | 9.0 | 26 | 0.300 | 30.0 | 24 | 2.1 | 31 | 2.30 | 1.88 | 85.7(#2) |
| #4 | 11.0 | 20 | 0.250 | 26.0 | 22 | 3.0 | 35 | 1.53 | 2.40 | 69.3(#1) |
| #5 | 2.0 | 8 | 0.200 | 28.0 | 22 | 3.0 | 30 | 0.22 | 2.96 | 70.0(#1) |
| #6 | 6.0 | 16 | 0.250 | 30.0 | 20 | 2.5 | 45 | 0.80 | 2.98 | 80.0(#2) |
| #7 | 10.0 | 31 | 0.300 | 28.0 | 26 | 2.0 | 34 | 3.13 | 1.60 | 80.0(#2) |
| #8 | 20.0 | 20 | 0.330 | 30.0 | 14 | 2.9 | 30 | 2.46 | 2.84 | 89.6(#2) |
| #9 | 10.0 | 18 | 0.340 | 32.0 | 22 | 3.0 | 31 | 1.20 | 2.79 | 97.0(#2) |
| #10 | 10.0 | 20 | 0.330 | 35.0 | 16 | 2.8 | 55 | 1.22 | 2.91 | 104.5(#3) |
| #11 | 21.0 | 29 | 0.210 | 38.0 | 16 | 2.5 | 31 | 3.00 | 2.80 | 96.2(#3) |
| #12 | 18.0 | 35 | 0.290 | 40.0 | 20 | 3.0 | 36 | 3.49 | 1.72 | 112.7(#3) |
| #13 | 13.1 | 12.8 | 0.275 | 31.9 | 22 | 2.2 | 43.0 | 0.47 | 12.75 | 88.0(#2) |
| #14 | 13.9 | 12.8 | 0.275 | 31.9 | 22 | 2.2 | 43.0 | 0.47 | 13.53 | 88.0(#2) |
| #15 | 19.5 | 13.5 | 0.210 | 28.0 | 14 | 2.9 | 55.0 | 0.68 | 10.11 | 80.0(#2) |
| #16 | 16.5 | 18.5 | 0.270 | 37.2 | 16 | 2.3 | 53.0 | 0.95 | 7.73 | 101.9(#3) |
| #17 | 16.5 | 18.5 | 0.270 | 32.0 | 16 | 2.3 | 53.0 | 1.10 | 6.65 | 87.7(#2) |
| #18 | 14.5 | 12.8 | 0.280 | 31.4 | 20 | 3.0 | 43.0 | 0.53 | 9.12 | 87.2(#2) |
| #19 | 10.3 | 12.8 | 0.275 | 28.0 | 22 | 2.2 | 43.0 | 0.54 | 8.80 | 77.2(#1) |
| #20 | 5.5 | 14.0 | 0.275 | 29.0 | 22 | 2.2 | 43.0 | 0.62 | 4.07 | 80.0(#2) |
| #21 | 3.8 | 11.0 | 0.275 | 33.0 | 22 | 2.2 | 43.0 | 0.34 | 5.18 | 91.0(#2) |
| #22 | 14.0 | 12.0 | 0.275 | 32.0 | 22 | 2.2 | 43.0 | 0.41 | 15.55 | 88.3(#2) |

FIG. 4

| Engine | Gear Ratio | Oil Flow (gpm) | Fan Diameter (in.) | Net Thrust (lbf) | Gearbox Efficiency Rating |
|---|---|---|---|---|---|
| Engine 1 | 7 | 10.1 | 188.6 | 25000 | 0.51 |
| Engine 2 | 7 | 6 | 142.8 | 12500 | 0.42 |
| Engine 3 | 7 | 8.1 | 188.4 | 25000 | 0.41 |
| Engine 4 | 5.1 | 17 | 120 | 25000 | 0.29 |
| Engine 5 | 4.1 | 12.3 | 120 | 25000 | 0.21 |
| Engine 6 | 4.83 | 18.05 | 120 | 25500 | 0.30 |
| Engine 7 | 4.97 | 19.69 | 120 | 25500 | 0.33 |
| Engine 8 | 4.76 | 17.88 | 120 | 25500 | 0.30 |
| Engine 9 | 5.24 | 19.44 | 120 | 25500 | 0.32 |
| Engine 10 | 5.36 | 18.43 | 120 | 25500 | 0.31 |

FIG. 8

| Engine | Gear Ratio | Oil Flow (gpm) | Fan Diameter (in.) | Net Thrust (lbf) | LPT Stages | Overall Engine Efficiency Rating |
|---|---|---|---|---|---|---|
| Engine 11 | 4 | 51.2 | 140 | 80000 | 3 | 1.92 |
| Engine 12 | 2.45 | 20 | 87.7 | 28700 | 4 | 2.10 |
| Engine 13 | 3.146 | 43 | 87.7 | 28700 | 3 | 2.54 |
| Engine 14 | 2 | 16 | 81 | 25000 | 3 | 0.97 |
| Engine 15 | 3.7 | 20 | 81 | 30151 | 3 | 0.91 |
| Engine 16 | 3.5 | 30 | 95 | 35000 | 4 | 2.81 |
| Engine 17 | 2.45 | 35 | 87.7 | 28700 | 4 | 3.67 |
| Engine 18 | 4 | 45 | 120 | 35000 | 4 | 7.37 |
| Engine 19 | 3.7 | 40 | 81 | 30151 | 5 | 5.03 |
| Engine 20 | 3.5 | 55 | 95 | 35000 | 4 | 5.16 |

FIG. 17

GAS TURBINE ENGINE WITH ACOUSTIC SPACING OF THE FAN BLADES AND OUTLET GUIDE VANES

CROSS-REFERENCE TO RELATED APPLICATIONS

This application is a continuation-in-part of U.S. application Ser. No. 18/744,069, filed Jun. 14, 2024. The prior application is incorporated herein by reference in its entirety.

FIELD

This application generally relates to gas turbine engines for aircraft and, more particularly, to geared gas turbine engines with an acoustic spacing and other noise-reducing architecture.

BACKGROUND

A gas turbine engine for an aircraft typically includes a fan, a compressor, a combustion section, a turbine section, and a nozzle section. The fan propels air entering the gas turbine engine into the compressor. The compressor increases the pressure of the air as the air is routed into the combustion section. The combustion section combusts the pressurized air with fuel to produce combustion gases. The combustion gases are routed through the turbine section and exit the gas turbine engine via the nozzle section, thereby producing thrust.

BRIEF DESCRIPTION OF THE DRAWINGS

FIG. 4 shows exemplary acoustic spacing ratios for exemplary gas turbine engines.

FIG. 8 is a chart depicting various engine parameters of several exemplary turbomachine engines, including a gearbox efficiency rating.

FIG. 17 is a chart depicting various engine parameters of several exemplary turbomachine engines, including an overall engine efficiency rating.

DETAILED DESCRIPTION

Figure 1:
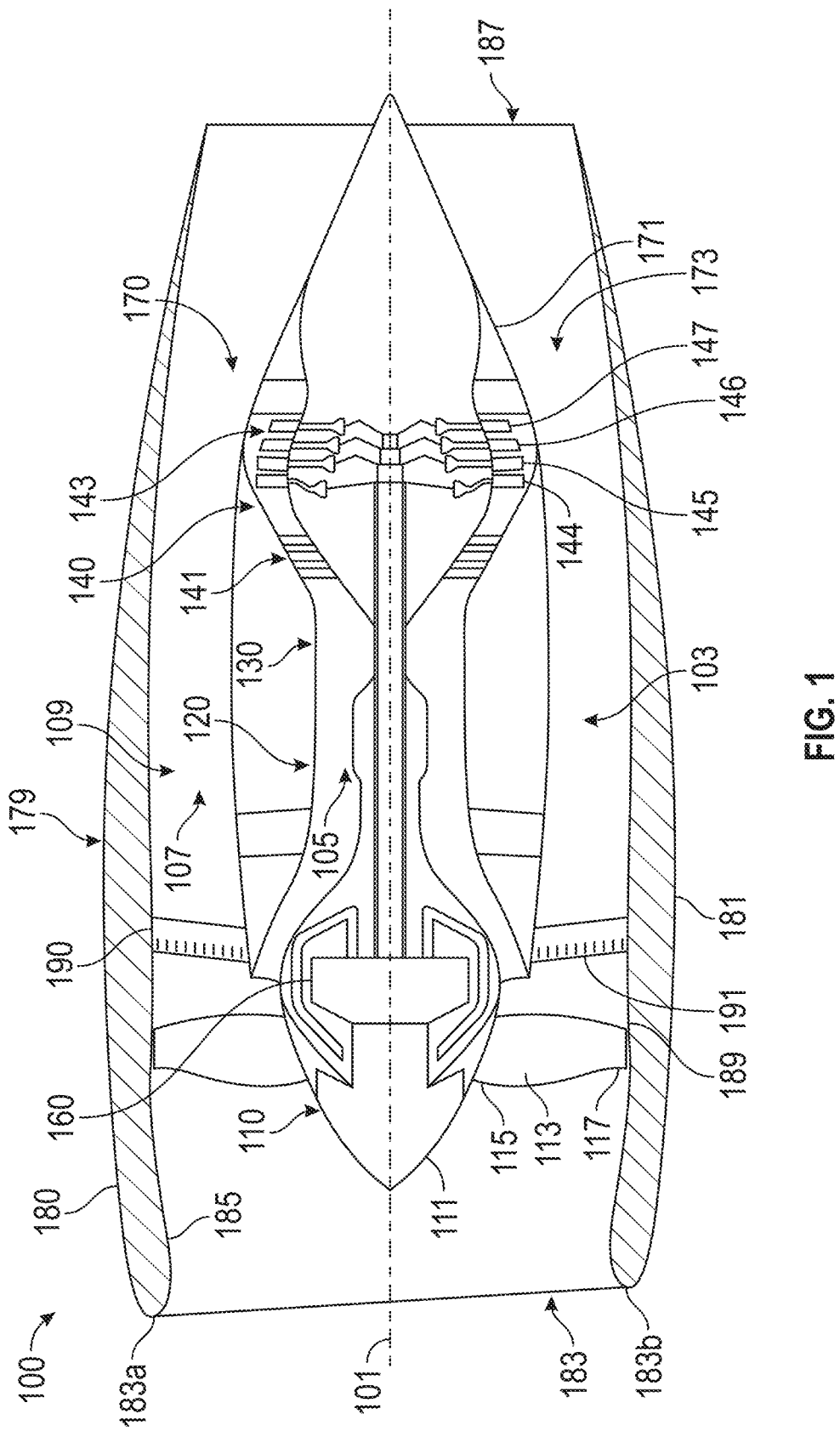
FIG. 1 shows a schematic view of an exemplary gas turbine engine, according to one example.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features and characteristics described in conjunction with a particular aspect, embodiment or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are relatively discernable by one of ordinary skill in the art.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A," "B," "C," "A and B," "A and C," "B and C" or "A, B and C." As used herein, the term "coupled" generally means physically, chemically, electrically, magnetically, or otherwise coupled or linked and does not exclude the presence of intermediate elements between the coupled items absent specific contrary language.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein in this application and in the claims, the term "axial" refers to a dimension extending along a central longitudinal axis of the gas turbine engine from a forward portion of the gas turbine engine to an aft portion of the gas turbine engine.

As used herein in this application and in the claims, the term "radial" refers to a dimension extending radially outwards from the central longitudinal axis.

As used herein in this application and in the claims, the term "OGV" refers to an outlet guide vane of the gas turbine engine.

As used herein in this application and the claims, the term "noise standards" refers to any required U.S. regulatory limits established to control the noise produced by aircraft with gas turbine engines during takeoff.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described herein below may be manufactured or formed using any suitable process, such as an additive manufacturing process, such as a 3-D printing process. The use of such a process may allow such components to be formed integrally, as a single monolithic component, or as any suitable number of sub-components. In particular, the additive manufacturing process may allow such components to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

Gas turbine engines generate significant noise during operation and it is desirable to reduce the amount of noise generated. The degree of noise generated is a function of, among other things, the relative positioning of components of the engine. Modifications to the engine's architecture, such as the relative position of a vane downstream of a rotating part and the airfoil characteristics of the vane, can have a significant impact on the noise generated. However, changes made to reduce noise can also negatively impact performance in terms of weight, drag, etc. One cannot simply change relative positions or airfoil characteristics without imposing significant penalties on the engine drag, weight, etc. Thus, there are difficult trade-offs to be made between, on the one hand, reducing the noise envelope to satisfy more stringent community noise requirements and, on the other hand, not negating performance improvements (weight, drag, specific fuel consumption, etc.) for the sake of reducing the noise generated at take-off. Conventional methods of reducing gas turbine engine noise, such as varying fan pressure ratio ("FPR"), can be insufficient to meet increasingly stringent community noise requirements.

The inventors of the present disclosure have found that a quieter gas turbine engine can be achieved by providing a specific range of acoustic spacing between the fan blades and OGVs in combination with specific ranges of certain other features of the engine architecture. Such a configuration of the fan blades and OGVs may maintain a desired overall propulsive efficiency for the turbofan engine while desirably reducing the noise generated by the engine. As part of the process of determining this acoustic spacing, the inventors discovered that a relationship between a ratio of the acoustic spacing and a blade effective acoustic length, which is determined based on particular features of fan (e.g., chord length, span, stagger angle, radius ratio, number of blades), can provide desirable improvements in noise reductions for the gas turbine engine.

Improving noise reduction is particularly important so that the engine can be designed to have greater propulsive power while still meeting required noise standards. Improvements to a gearbox efficiency rating, referred to as overall engine efficiency rating, can result in improved propulsive efficiencies that may increase acoustic noise generated by the engine during operation. Increases in acoustic noise may come from fans with gear ratios less than 5.0, less than 4.0, or between 2-3.5. Engines with lower gearbox ratios, for example, can produce higher noise levels due to increased fan speeds and blade tip speeds when the OGV is spaced more closely to the fan blades. Improved gearbox efficiency is important for matching the desired gearbox characteristics to the engine needs and sizing, and without suffering penalties associated with excessive heating of oil (added weight and drag associated with heat exchangers).

When incorporating power gearboxes with the improved gearbox efficiencies disclosed herein, the spacing between OGV and fan blades is expected to decrease to accommodate the loads on an engine frame supporting a gearbox. Noise suppression is desirable without adversely influencing a desired aero-performance (e.g., by setting a desired solidity in the fan blades in the design). In some embodiments, for example, the gearbox efficiencies disclosed herein provide a high speed LPT with 3 or 4 stages. A high speed LPT proximal to the core nozzle exhaust is an additional noise source that will add pressure to the aggregate noise of the overall engine. The engine's noise signature is an amalgamation of fan noise, fan nozzle jet velocity, LPT blade passing, core nozzle exit velocity. That noise is likely to go up overall given the high speed LPT, so mitigating the remaining noise sources is very important without detracting from fan efficiency through the bypass and into the core, thus reinforcing the benefits of adopting the desired ranges for BEAL and ASR as provided herein.

FIG. 1 is a schematic cross-section view of a gas turbine engine 100 configured to produce thrust or power for an aircraft. In some examples, the gas turbine engine 100 can be an aircraft engine configured to produce at least 17,500 horsepower of thrust. In other examples, the gas turbine engine 100 can be an aircraft engine configured to produce between 1 and 17,500 horsepower of thrust.

The gas turbine engine 100 defines a central longitudinal axis 101 extending between a forward portion and a rear portion of the gas turbine engine 100. The gas turbine engine 100 includes a core turbine engine 103 centered about the central longitudinal axis 101, a fan 110 disposed forward of the core turbine engine 103, a nacelle 179 which includes a fan case 180 encasing or housing the fan 110, and outlet guide vanes ("OGVs") 190 disposed aft of the fan 110 and extending radially between the core turbine engine 103 and the fan case 180. FIG. 1 illustrates a fan case 180 generally extending to the aft end of the gas turbine engine; however, in other examples, the length and/or relative position of the fan case to the gas turbine engine (forward and/or aft) may vary.

The fan 110 is configured to propel air through the gas turbine engine 100. During the operation of the gas turbine engine 100, the fan 110 draws a first portion of the air 105 into the core turbine engine 103. The fan 110 draws a second portion of the air 107 into a bypass stream 109 disposed outside the core turbine engine 103. The fan 110 comprises a fan disk 111 and a plurality of fan blades 113 that radially extend from the fan disk 111. However, other examples of the fan 110 can comprise additional or alternative components.

The fan disk 111 is centered about and is configured to rotate about the central longitudinal axis 101. The fan disk 111 comprises a front hub that can be aerodynamically contoured to promote airflow through the fan 110.

The plurality of fan blades 113 are coupled to and uniformly spaced around the circumference of the fan disk 111. Each of the plurality of fan blades 113 comprises a fan blade root 115, at which the fan blade 113 is coupled to the fan disk 111, and a fan blade tip 117 disposed opposite the fan blade root 115. The fan blade root 115 is oriented radially inwards towards the central longitudinal axis 101, while the fan blade tip 117 is oriented radially outward away from the central longitudinal axis 101. The distance between the fan blade root 115 and the fan blade tip 117 defines a span or a length of the fan blade 113.

In some examples, the number ($N_b$) of fan blades 113 can desirably be between 14 and 26 fan blades. In other examples, the plurality of fan blades 113 can number between 20 and 24 fan blades, 20 and 22 fan blades, or 22 fan blades.

Characteristics of the fan 110 include the fan pressure ratio ("FPR"). FPR is defined as the ratio of the pressure of the air entering fan 110 from an upstream direction to the pressure of the air exiting the fan 110 in a downstream direction. In some examples, the FPR of the gas turbine engine 100 can be greater than or equal to 1.25 and less than or equal to 1.45. In other examples, the FPR can be greater than 1.30 or 1.35, and less than 1.40.

During operation, the core turbine engine 103 generates mechanical energy for rotating the fan 110. The core turbine engine 103, disposed aft of the fan 110, includes a compressor section 120, a combustion section 130, a turbine section 140, a drive shaft system 150, a gearbox assembly 160, and a nozzle section 170. However, other examples of the gas turbine engine 100 can comprise additional or alternative components.

During operation, the compressor section 120 compresses or increases the pressure of the air 105 propelled into the core turbine engine 103 by the fan 110. The compressor section 120 is typically the forward-most component of the core turbine engine 103 and thus can be disposed directly aft of the fan 110. In some examples, the compressor section 120 comprises one or more stages of a low-pressure compressor and one or more stages of a high-pressure compressor.

The combustion section 130, which is disposed aft of the compressor section 120, combusts the air pressurized by the compressor section 120 with fuel to produce combustion gases.

During operation, the turbine section 140 generates power by extracting thermal and kinetic energy from the combustion gases produced by the combustion section 130. The turbine section 140 produces power in any suitable range sufficient to power the fan 110. The turbine section 140 comprises a high pressure turbine 141 and a low pressure turbine 143. The high pressure turbine 141, disposed aft of the combustion section 130, extracts energy from the combustion gases leaving the combustion section 130. The low pressure turbine 143 is disposed aft of the high pressure turbine 141 and extracts energy from combustion gases leaving the high pressure turbine 141.

In some examples, the low pressure turbine 143 can comprise a plurality of low pressure turbine stages 144, 145, 146, 147. In the illustrated example, the low pressure turbine 143 can be a four-stage low pressure turbine comprising, from fore to aft, a first low pressure turbine stage 144, a second low pressure turbine stage 145, a third low pressure turbine stage 146, and a fourth low pressure turbine stage 147. In some examples, the low pressure turbine comprises three or more stages, such as three stages, four stages, or five stages. Including additional low pressure turbine stages can desirably increase the amount of work extracted from the combustion gases and in some examples, the low pressure turbine comprises four or more stages, such as four stages or five stages.

The drive shaft system 150 can include a high pressure shaft system that couples the high pressure turbine 141 to the compressor section 120 and a low pressure shaft system connecting the low pressure turbine 143 to the fan 110, thereby allowing the turbine section 140 to power the fan 110 and the compressor section 120. In some examples, the drive shaft system 150 can couple the high pressure turbine 141 to the high pressure compressor (not pictured) and can couple the low pressure turbine 143 to the low pressure compressor (not pictured) and the fan 110. In some examples, the drive shaft system 150 can comprise a plurality of concentric shafts configured to rotate about and extending along the central longitudinal axis 101 (also referred to herein as the engine centerline).

The gearbox assembly 160 couples the turbine section 140 to the fan 110. In some examples, the gearbox assembly 160 can be configured to receive power from a plurality of sources. In some examples, the gearbox assembly 160 can be configured to receive power from each of the low pressure turbine stages 144, 145, 146, 147. The gearbox assembly 160 can be configured to drive or output the power to the fan 110, thereby allowing the low pressure turbine 143 and the fan 110 to rotate at their respective optimal rotational speeds without affecting the operation of the other components. In some of these examples, the gearbox assembly 160 can comprise one or more epicyclic gearboxes or any other suitable gear train configured to couple the turbine section 140 to the fan 110.

The gearbox assembly 160 reduces the rotational speed of the output (to the fan) relative to the input (from the low pressure turbine). In some examples, a gear ratio of the gearbox assembly 160 can be 2-7. For example, the gear ratio can be 2-2.9, 2.5-5.0, 3.2-4, or 3.25-3.75. In some examples, a gear ratio of the gearbox assembly can be greater than 4, such as 4.1-7.0, 4.1-6.0, or 4.1 to 5.1.

The gearbox assembly can comprise various types and/or configurations. For example, in some instances, the gearbox is an epicyclic gearbox configured in a star gear configuration. Star gear configurations comprise a sun gear, a plurality of star gears (which can also be referred to as "planet gears"), and a ring gear. The sun gear is the input and is coupled to the power turbine (e.g., the low-pressure turbine) such that the sun gear and the power turbine rotate at the same rotational speed. The star gears are disposed between and interconnect the sun gear and the ring gear. The star gears are rotatably coupled to a fixed carrier. As such, the star gears can rotate about their respective axes but cannot collectively orbit relative to the sun gear or the ring gear. As another example, the gearbox is an epicyclic gearbox configured in a planet gear configuration. Planet gear configurations comprise a sun gear, a plurality of planet gears, and a ring gear. The sun gear is the input and is coupled to the power turbine. The planet gears are disposed between and interconnect the sun gear and the ring gear. The planet gears are rotatably coupled to a rotatable carrier. As such, the planet gears can rotate about their respective axes and also collectively rotate together with the carrier relative to the sun gear and the ring gear. The carrier is the output and is coupled to the fan assembly. The ring gear is fixed from rotation.

Once the combustion gases have exited the turbine section 140, the combustion gases pass through the nozzle section 170 and exit the gas turbine engine 100. In some examples, the nozzle section can comprise two co-annular nozzles: a combustion nozzle 171 and a fan nozzle 173. The combustion nozzle 171 is the centermost co-annular nozzle configured to allow combustion gases to exit the core turbine engine 103. The fan nozzle 173 is the outermost co-annular nozzle configured to allow air to exit the bypass stream 109.

The fan case 180 houses or encloses the fan 110. The fan case 180 comprises a hollow shell 181, an inlet 183, a lip 185, an outlet 187, and an acoustic treatment 189. However, other examples of the fan case 180 can include additional or alternative components.

The hollow shell 181 protects and/or insulates the fan 110. The hollow shell 181 extends along the central longitudinal axis 101 from the inlet 183 to the outlet 187. The hollow shell 181 is sized to encompass the core turbine engine 103 fully (as shown), or partially such that the inlet 183 is disposed forward of the fan 110 and the outlet 187 is disposed aft of the OGVs 190. The hollow shell 181 features a streamlined shape to improve aerodynamic performance. In some examples, the hollow shell 181 can be streamlined or tapered such that the inlet 183 or a forward end portion of the hollow shell 181 has a wider diameter than the outlet 187 or an aft end portion of the hollow shell 181.

During operation, the inlet 183 allows the passage of air into the gas turbine engine 100. The inlet 183 comprises a circular, forward-facing opening in the hollow shell 181 centered about the central longitudinal axis 101. In some examples, the inlet 183 can be angled relative to the central longitudinal axis 101 such that a top portion 183a of the inlet 183, i.e., a portion of the inlet 183 at a twelve o'clock position when the gas turbine engine 100 is mounted to an aircraft, extends forward of a bottom portion 183b of the inlet 183 at a six o'clock position, as shown.

The inlet 183 and the hollow shell 181 define a lip 185 extending along the circumference of the inlet 183 at the forward-most edge portion of the hollow shell 181. The lip 185 is contoured or curved to improve aerodynamic performance and/or reduce flow separation. For example, the lip 185 can be contoured such that the hollow shell 181 forms an hourglass shape (in cross-section) forward of the fan 110.

During operation, the outlet 187 allows air and combustion gases to exit the fan case 180. The outlet 187 comprises a circular, aft-facing opening in the hollow shell 181. The outlet 187 can be centered about and orthogonal to the central longitudinal axis 101 of the gas turbine engine 100.

The acoustic treatment 189 can be provided to acoustically insulate the fan case 180 during operation, thereby desirably reducing the amount of noise emitted by the gas turbine engine 100. The acoustic treatment 189 can comprise a multi-layered liner disposed on a circumferential interior surface of the hollow shell 181. When disposed on the circumferential interior surface of the hollow shell 181, the multi-layered liner can comprise a radially innermost porous layer, an intermediate partitioned layer, and a radially outermost impervious layer. In some examples, the acoustic treatment 189 is disposed on the portion of the interior surface of the hollow shell 181 extending between the fan 110 and the OGVs 190.

The OGVs 190 couple the fan case 180 to the core turbine engine 103 and steer the air 107 in the bypass stream 109 towards the fan nozzle 173 and the outlet 187. The OGVs 190 extend radially outwards to the circumferential interior surface of the hollow shell 181 of the fan case 180, and can be disposed in a radially uniform fashion around the circumference of the core turbine engine 103. In some examples, the OGVs 190 can be swept such that a tip or a radially outward end portion of each of the OGVs 190 is angled towards the aft end of the gas turbine engine 100.

In some examples, each of the OGVs comprises a serrated leading edge 191. The serrated leading edge 191 can comprise a waveform or a serration extending radially along the edge of each of the OGVs 190. The waves or serrations are configured to reduce the noise generated by the air in the bypass stream 109 passing over the OGVs 190.

The example gas turbine engine 100 depicted in FIG. 1 should not be construed to preclude other suitable configurations of gas turbine engines. It should also be appreciated that aspects of the present disclosure can be incorporated into other suitable gas turbine engines used in aircraft.

Figure 2:
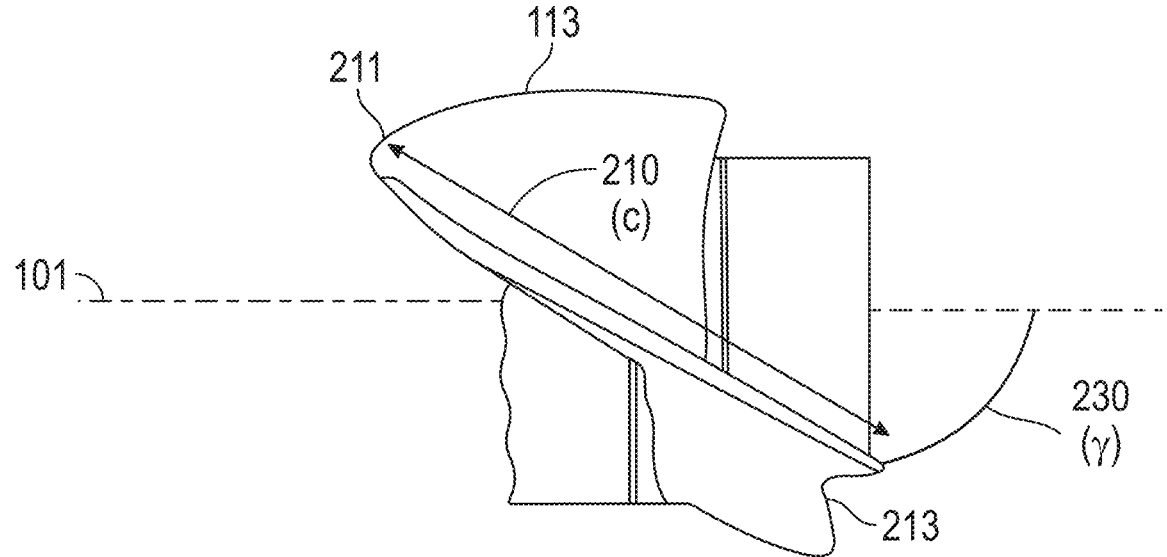
FIG. 2 shows a top view of a fan blade for a gas turbine engine, according to one example.
Figure 5:
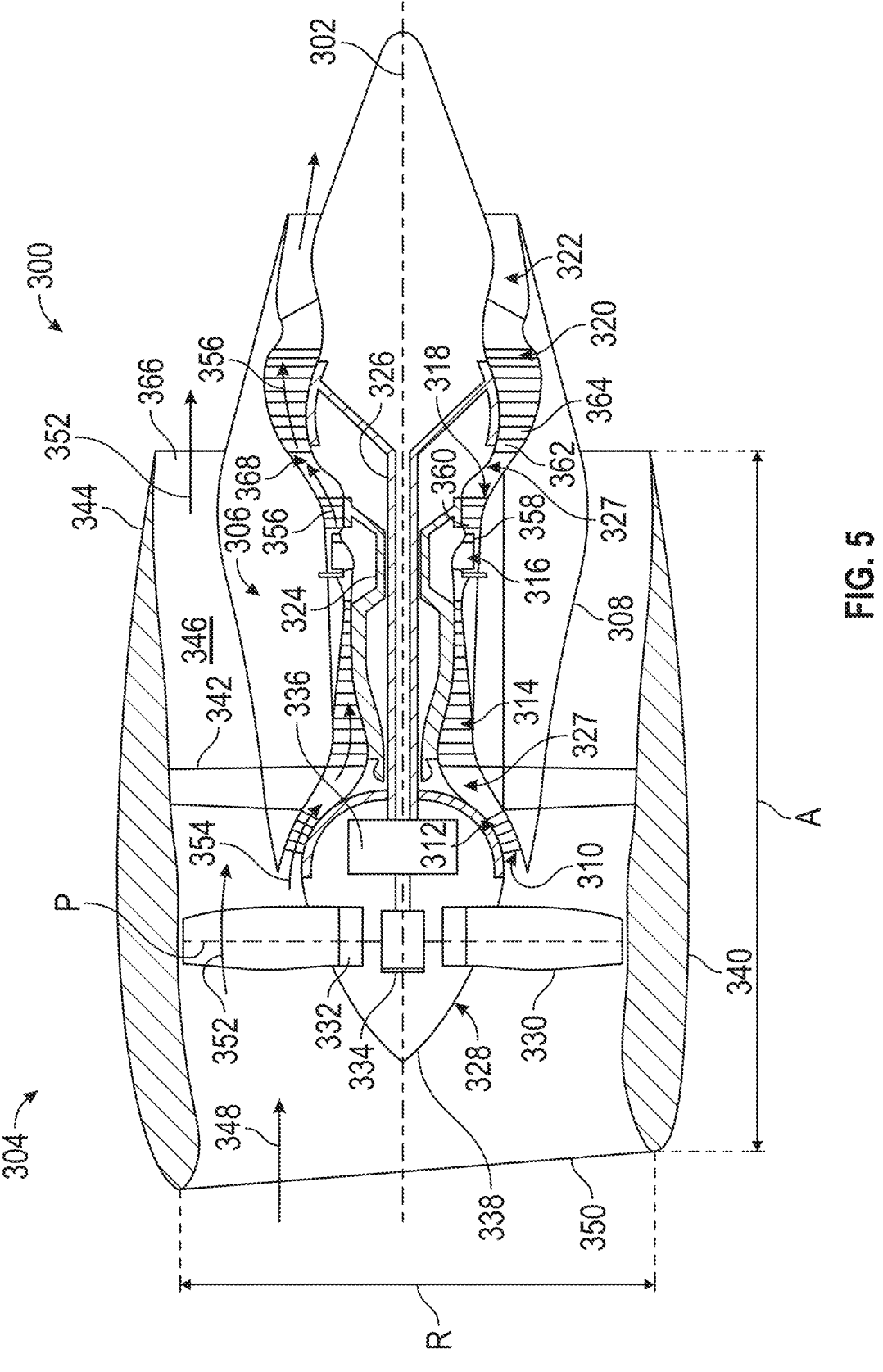
FIG. 5 is a cross-sectional schematic illustration of an example of a turbomachine engine configured with a ducted propulsion system.

FIG. 2 shows a top view of a fan blade 113 and FIG. 5 shows a view of the fan 110. Each of the fan blades 113 have a blade solidity (c/s). Each fan blade has a radial span extending from a root at a 0% span position to a tip at a 100% span position. The span S of a blade is the difference in the radius of a leading edge at the tip 217 and the radius of the leading edge of the root at the hub 215.

Blade solidity is defined as the ratio of chord length (c) 210 to the circumferential spacing (s) between the fan blade 113 and a nearest adjacent fan blade 113, measured at a 75% span position of the fan blade 113. As shown in FIG. 2, the chord length 210 is a straight-line distance between a leading edge 211 and a trailing edge 213 of the fan blade. The spacing (s) between adjacent fan blades is calculated by multiplying a fan diameter by 7E and dividing the product by the number (N$_b$) of fan blades. In a first set of examples, enhanced performance can be observed when the blade solidity of the gas turbine engine is greater than or equal to 0.8 and less than or equal to 2. In a second set of examples, enhanced performance can be observed when the blade solidity is greater than or equal to 0.8 and less than or equal to 1.5. In a third set of examples, enhanced performance can be observed when the blade solidity is greater than or equal to 1 and less than or equal to 2. In a fourth set of examples, enhanced performance can be observed when the blade solidity is greater than or equal to 1.25 and less than or equal to 1.75.

In addition, the fan preferably has a low radius ratio (rr), which is a ratio of the radius of the leading edge of the root at the hub 215 to the radius 217 of a blade tip or 100% span position of a blade, both measured from the central longitudinal axis 101 at the leading edge 211 of fan blades as shown in FIG. 5. In some examples, the radius ratio (rr) is 0.2 to 0.35, in other examples, the radius ratio (rr) is 0.25 to 0.3.

Each of the plurality of fan blades 113 defines a stagger angle (γ) 230. The stagger angle 230 is an angle between the central longitudinal axis 101 and a chord line (along which the chord length is measured) as measured at the 75% span position of the respective fan blade. In some examples, the stagger angle 230 can range from 30 degrees to 75 degrees. In other examples, the stagger angle 230 can range from 30 degrees to 60 degrees.

As discussed above, the inventors, during the course of engine design, sought to improve engine performance characteristics including thrust efficiency, installation, engine length from inlet to nozzle, fan case and core size (affecting installed drag) and staying within a maximum weight budget. In one example, the OGVs were mounted to a fan frame, along with the fan and the gearbox assembly. This meant that the OGVs would be located relatively close to the fan so that a more compact engine and efficient (strength/weight) load bearing fan frame could be realized. But the resulting proximity of the fan to the OGVs was found to generate more noise than desired. From an acoustics standpoint, one instead wants to space the fan and the OGVs further apart from each other, generally speaking. But this change can impact the placement of other subsystems and adversely affect overall performance, e.g., gearbox assembly placement and resulting load balances associated with the fan frame, fan frame length, overturning moments, and overall weight of a nacelle, either the fan case type illustrated in FIG. 1 or an engine with a short fan case, such as the engines illustrated in FIGS. 3 and 4, and described in paragraphs [0083]-[0092] of U.S. Patent Application Publication No. 2022/0042461, which have a fan nozzle terminating well upstream of the core nozzle located downstream of the low pressure turbine. As each change impacts other systems, there is a need to understand what combination, or extent of modifications, provide improved acoustic performance without unacceptably negatively impacting other aspects of the engine architecture, as mentioned. Thus, it was exceedingly more challenging to determine how to implement changes without affecting other aspects of the architecture upon which increased performance was dependent upon, than simply making modifications to reduce the noise generated.

Taking these things in mind, the inventors unexpectedly discovered that gas turbine engines, such as the gas turbine engine 100 of FIG. 1, embodying the below-described characteristics have improved acoustic characteristics, but without imposing severe and unacceptable penalties on other aspects of the architecture or engine aero-performance. For example, the inventors found that gas turbine engines with desirable placement of OGVs, such as the OGVs 190 of FIG. 1, may result in the maintaining of or improving upon a desired propulsive efficiency, while improving the turbofan engine's acoustic properties.

FIG. 5 is a schematic, partial cross-sectional view of a gas turbine engine in accordance with the disclosure. For gas turbine engines that have a blade solidity greater than or equal to 0.8 and less than or equal to 2, it has been found that such engines are characterized by a blade effective acoustic length (BEAL) that can be used, as explained below, to determine a range of modifications and/or adjustments that provide improved acoustic performance. The BEAL is determined from (1) below:

$$BEAL = \frac{2c^2}{S(1-rr)N_b}\cos(\gamma) \qquad (1)$$

where c is the chord length at 75% span, rr is the radius ratio of the fan, S is the full span of the fan blade (i.e., as measured at a 100% span position at the blade leading edge), γ is the stagger angle, and N$_b$ is the number of fan blades.

Exemplary ranges for the elements of the gas turbine engines described herein are provided below in Table 1. As shown in Table 1, for some variables, the exemplary ranges vary depending on a corresponding range of fan blade diameter. For example, the fan blade diameter (FBD) for three different ranges, FBD #1, FBD #2, and FBD #3 are shown below.

65≤FBD #1<80 inches
80≤FBD #2<95 inches
95≤FBD #3<115 inches

TABLE 1

| Symbol | Description | Exemplary Ranges for Use with BEAL |
|---|---|---|
| c | Chord length at 75% span position (ranges based on FBD) | 5" to 28" (for FBD#1) 6" to 33" (for FBD#2) 7" to 35" (for FBD#3) |
| S | Span of fan blade at 100% span position (ranges based on FBD) | 24" to 30" (for FBD#1) 28" to 36" (for FBD#2) 32" to 40" (for FBD#3) |
| rr | Radius ratio (range) | 0.2 to 0.35 |
| Nv | Number of OGVs (ranges) | 1.5 Nb to 3 Nb, 1.8 Nb to 2.4 Nb, 2.0 Nb to 2.5 Nb, or 2.2 Nb to 2.6 Nb |
| γ | Stagger angle (ranges) | 30°-75° or 30°-60° |
| N$_b$ | Number of fan blades (ranges) | 14-26, 20-24, 20-22, or 22 |

As shown in FIG. 5, an acoustic spacing 255 (As) is a length, measured parallel to the central longitudinal axis 101, that extends from the trailing edge 213 of the fan blade 113 to the leading edge 257 of a corresponding one of the OGVs 190. An inlet length 259 is an axial distance between the leading edge 211 of a fan blade 113 and the inlet 183. The acoustic spacing 255, chord length 210 (FIG. 2), and inlet length 259 are measured at the 75% span position of the fan blade 113.

An acoustic spacing ratio (ASR) can be determined using the BEAL, ratio of Nv/Nb, and the acoustic spacing (As) as shown below in (2):

$$ASR = \frac{1}{\left(\frac{Nv}{Nb}\right)} \cdot \frac{As}{BEAL} \tag{2}$$

Nv is the number of vanes of the OGVs. In some examples, the number of OGVs (Nv) are at least twice the number of fan blades (Nb). In some examples, a ratio of the number of OGVs to the number of fan blades (Nv/Nb) is 2.0 to 2.5, or 2.2 to 2.6. In other examples, the ratio of the number of OGVs to the number of fan blades (Nv/Nb) is 1.5 to 3.0 or 1.8 to 2.4.

Varying the acoustic spacing ratio can impact engine performance in the following ways. For example, gas turbine engines with higher acoustic spacing ratios can emit less noise. And gas turbine engines with lower acoustic spacing ratios can reduce the size of the gas turbine engines, thereby beneficially reducing fuel consumption and emissions generated by the gas turbine engines.

Gas turbine engines with the acoustic spacing ratios described herein exhibited the sought-after balance (discussed above) between noise emissions and engine size, thereby featuring enhanced performance over conventional gas turbine engines. For example, enhanced results can be achieved with acoustic spacing ratios from 1.5 to 16, including the lower ratios such as 1.5 to 3.1 or 1.6 to 3, 1.6 to 2.4 or 2.0 to 3, and higher ratios such as 4 to 14 or 6.6 to 13.5, to depending on a desired acoustic spacing and fan blade design.

Figure 3:
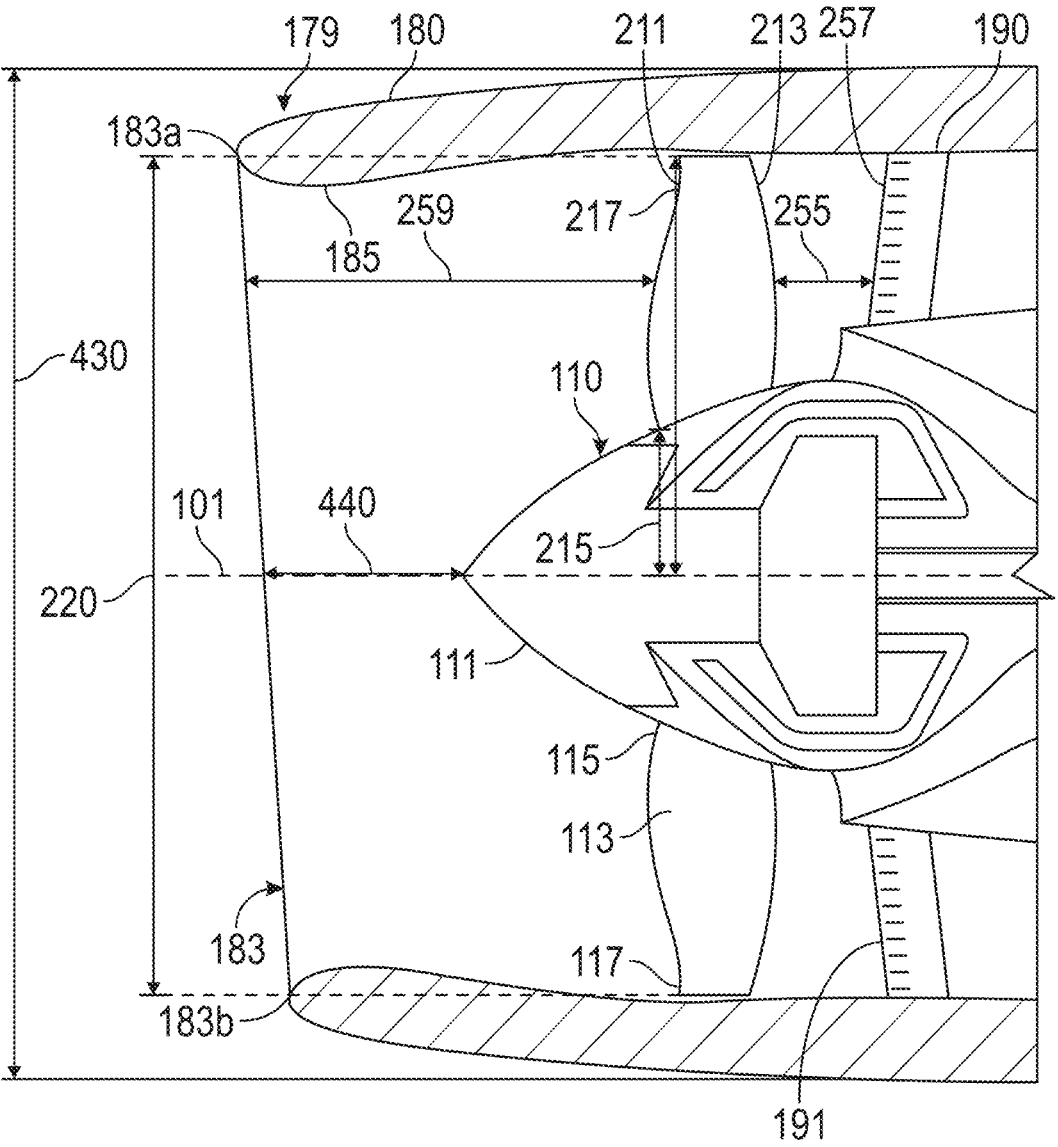
FIG. 3 is a partial view of a gas turbine engine with an acoustic spacing, according to one example.

As shown in FIGS. 1 and 3, the axial extent of the inlet 183 can vary, e.g., between a twelve o'clock position and a six o'clock position. For this type of fan case 180, the inlet length 259 is the average the axial distance between the leading edge 211 of the fan blade 113 and the top portion 183a of the inlet 183, and the axial distance between the leading edge 211 the fan blades 113 and the bottom portion 183b of the inlet 183, i.e., the inlet length 259 is distance from the leading edge 211 of the fan blade 113 and the inlet 183, as measured at the 75% span position of the fan blade 113.

In one set of examples, the fan diameter 220 ranges from 52 in. to 120 in. In another set of examples, the fan diameter 220 ranges from 75 in. to 105 in. In additional sets of examples, the fan diameter 220 ranges from 70 in. to 80 in, 80 in. to 95 in., or 95 in. to 105 in. An inlet length ratio is the ratio of the inlet length 259 to the fan diameter 220. Enhanced performance of gas turbine engines 100 can be achieved with inlet length ratios from 0.15 to 0.5. Gas turbine engines 100 with inlet length ratios less than or equal to 0.5 can desirably feature enhanced performance compared to conventional gas turbine engines 100 due to reduced fan case length, reduced drag, and reduced fan distortion. In another set of examples, enhanced performance can unexpectedly be achieved with inlet length ratios from 0.15 to 0.4. In further examples, enhanced performance can be achieved with inlet length ratios from 0.15 to 0.3.

In another set of examples, an inlet-to-nacelle (ITN) ratio is defined as a ratio of the inlet length 259 to a nacelle outer diameter 430, which is the largest diameter of the nacelle 179. Enhanced performance of gas turbine engines 100 can be achieved with ITN ratios from 0.23 to 0.35. Gas turbine engines 100 with ITN ratios can desirably feature enhanced performance compared to conventional gas turbine engines 100 due to reduced fan case length, reduced drag, and reduced fan distortion. In another set of examples, enhanced performance can unexpectedly be achieved with ITN ratios from 0.27 to 0.35, and from 0.30 to 0.33.

FIG. 5 illustrates a disk spacing length 440, which is the distance between a forwardmost end of the fan disk 111 and the intersection of the inlet taken along the engine centerline (i.e., central longitudinal axis 101). A disk-to-blade diametric (DBD) ratio is the ratio of the disk spacing length 440 to the fan diameter 220. The inventors of the present disclosure have found that enhanced performance of gas turbine engines 100 can be achieved with disk-to-blade diametric ratios that are less than or equal to 0.6, and in some examples with disk-to-blade diametric ratios that range from 0.09 to 0.59, 0.15 to 0.35, and 0.19 to 0.27. Gas turbine engines 100 with disk-to-blade diametric ratios in these ranges can desirably feature enhanced performance compared to conventional gas turbine engines 100 due to reduced drag and reduced fan distortion. Further benefits have been identified when a gas turbine engine is configured to have a DBD ratio in the ranges disclosed above, in combination with an ITN ratio in the ranges disclosed above. For example, a gas turbine engine can have a DBD ratio of 0.22 and an ITN ratio of 0.27, both of which meet at least one of the stated desirable ranges for the DBD and ITN ratios. It should be noted that a gas turbine engine can be configured to meet any combination of the disclosed DBD ratios and the disclosed ITN ratios.

In another set of examples, enhanced performance can unexpectedly be achieved with disk-to-nacelle ratios below 0.47. A disk-to-nacelle diametric (DND) ratio is the ratio of the disk spacing length 440 to the nacelle diameter 430. The inventors of the present disclosure have found that enhanced performance of gas turbine engines 100 can be achieved with disk-to-nacelle diametric ratios that range from 0.07 to 0.47, 0.15 to 0.35, and 0.19 to 0.27. Gas turbine engines 100 with disk-to-nacelle diametric ratios in these ranges can desirably feature enhanced performance compared to conventional gas turbine engines 100 due to reduced drag and reduced fan distortion. Further benefits have been identified when a gas turbine engine is configured to have a DND ratio in the ranges disclosed above, in combination with an ITN ratio in the ranges disclosed above. For example, a gas turbine engine can have a DND ratio of 0.21 and an ITN ratio of 0.27, both of which meet at least one of the stated desirable ranges for the DND and ITN ratios. It should be noted that a gas turbine engine can be configured to meet any combination of the disclosed DND ratios and the disclosed ITN ratios.

In another set of examples, enhanced performance can unexpectedly be achieved with disk-to-inlet length (DIL) ratios within the range 0.30 to 0.80. A disk-to-inlet ratio is the ratio of the disk spacing length 440 to the inlet length 259. The inventors of the present disclosure have found that enhanced performance of gas turbine engines 100 can be also be achieved with disk-to-inlet ratios that range from 0.4 to 0.8, 0.4 to 0.7, and 0.45 to 0.67. Gas turbine engines 100 with disk-to-inlet ratios in these ranges can desirably feature enhanced performance compared to conventional gas turbine engines 100 due to reduced drag and reduced fan distortion. Further benefits have been identified when a gas turbine engine is configured to have a DIL ratio in the ranges disclosed above, in combination with an ITN ratio in the ranges disclosed above. For example, a gas turbine engine can have a DIL ratio of 0.49 and an ITN ratio of 0.27, both of which meet at least one of the stated desirable ranges for the DIL and ITN ratios. It should be noted that a gas turbine engine can be configured to meet any combination of the disclosed DIL ratios and the disclosed ITN ratios.

Table 2 below illustrates exemplary engines with the disk-to-blade diametric (DBD) ratios, disk-to-nacelle diametric (DND) ratios, and disk-to-inlet (DIL) ratios in the ranges disclosed herein. For each exemplary gas turbine engine disclosed in Table 2, the gas turbine engine has an ITN ratio that is 0.23 to 0.35.

TABLE 2

| Engine | fan-disk spacing length (in) 440 | fan diameter (in) 220 | nacelle diameter (in) 430 | inlet length (in) 259 | DBD Ratio | DND Ratio | DIL Ratio |
|---|---|---|---|---|---|---|---|
| 1 | 24 | 46 | 64 | 36 | 0.52 | 0.38 | 0.67 |
| 2 | 26 | 53 | 75 | 37 | 0.49 | 0.35 | 0.70 |
| 3 | 35 | 61 | 87 | 48 | 0.57 | 0.40 | 0.73 |
| 4 | 24 | 69 | 96 | 37 | 0.35 | 0.25 | 0.65 |
| 5 | 21 | 78 | 102 | 37 | 0.27 | 0.21 | 0.57 |
| 6 | 22 | 78 | 104 | 39 | 0.28 | 0.21 | 0.56 |
| 7 | 48 | 93 | 115 | 63 | 0.52 | 0.42 | 0.76 |
| 8 | 17 | 88 | 116 | 35 | 0.19 | 0.15 | 0.49 |
| 9 | 21 | 80 | 107 | 32 | 0.26 | 0.20 | 0.66 |
| 10 | 10 | 115 | 135 | 33 | 0.09 | 0.07 | 0.30 |
| 11 | 36 | 61 | 77 | 45 | 0.59 | 0.47 | 0.80 |

FIG. 4 discloses acoustic spacing ratios for exemplary gas turbine engines as described herein. Engines #1, 2, 4, 5, and 19 illustrate exemplary engines with fan blades having fan diameters in the FBD #1 range, Engines #3, 6, 7, 8, 13, 14, 15, 17, 18, 20, 21, and 22 illustrate exemplary engines with fan blades having fan diameters in the FBD #2 range, and Engines #9, 10, 11, 12, and 16 illustrate exemplary engines with fan blades having fan diameters in the FBD #3 range. In each of the exemplary engines, the ASR is in the range of 1.5 to 16.0. ASR ranges can also be beneficially between 4.0 and 14.0, 6.6 and 13.5, or the other ranges disclosed herein.

In some embodiments, it was additionally found that the acoustic performance can be further improved without negatively affecting other aspects of performance by using composite fan blades to enable a higher bypass ratio. A higher bypass ratio can reduce noise generation, thereby improving acoustic performance, by reducing the fan pressure ratio of the fan (e.g., from 1.5 to 1.4, or 1.35), and operating within the defined ranges for BEAL and ASR, as discussed above. Some embodiments include turbomachines with bypass ratios of 10:1 to 17:1, or, in other examples from 12:1 to 15:1, where bypass ratio is defined as the ratio of air passing through the fan case that bypasses the inlet to the engine core, to the air that enters the engine core, at a takeoff condition. For the higher bypass ratios in this range, it was found that composite blades, operating in the defined BEAL and ASR ranges, provide improved acoustic performance while also providing improved blade toughness when encountering flutter or foreign object impact that can result in blade loss.

In some embodiments, the fan blades comprise composite materials. For example, the fan blade can comprise fiber-reinforced composite materials that include a matrix and one or more plies with fibers. The fiber-reinforced composite material can be formed from a continuous wrap ply or from multiple individual plies. In some examples, the fiber-reinforced composite material can be formed with a plurality of fiber plies (or bands) interwoven in an in-plane and out-of-plane orientation by interleaving each of the plurality of fiber bands with one or more of the plurality of fiber bands previously laid down and not in a common plane to fill the one or more gaps and define a uniformly covered multi-layered assembly. The plurality of fiber bands can also be interwoven in three or more different orientation angles, as described in U.S. Pat. No. 9,249,530, which is incorporated by reference in its entirety herein. In some examples, the fibers can be woven in three dimensions as described in U.S. Pat. No. 7,101,154, which is incorporated by reference in its entirety herein.

The fiber types may be mixed within a given layer, ply or different plies may be formed using different fiber types. In one example, harder, shear resistant fibers may be incorporated at an impact surface, while the fiber near a back surface may be selected for enhanced energy absorption. Non-limiting examples of harder shear resistant fibers include metallic or ceramic fibers. Non-limiting examples of fibers with relatively high energy absorption include S-glass, aramid fibers (e.g., Kevlar® and Twaron®), as well as oriented polyethylene fibers, such as Spectra® and Dyneem®. Kevlar® is sold by E. I. du Pont de Nemours and Company, Richmond Va. Twaron® aramid fibers are sold by Tejin Twaron, the Netherlands. Spectra® fiber is sold by Honeywell Specialty Materials, Morris N.J. Dyneema® fiber is sold by Dutch State Mines (DSM), the Netherlands.

FIG. 5 is a schematic cross-sectional view of a gas turbine engine in accordance with an example of the present disclosure, and with the acoustic spacing ratio (ASR) described herein as determined, for example, by using the BEAL, ratio of Nv/Nb, and the acoustic spacing (As) discussed above.

As discussed above, the inventors, during the course of engine design, sought to improve engine performance characteristics through acoustic spacing and related determinations. These changes however, can impact the selection and placement of gearbox assemblies. As further explained herein, the inventors also discovered that a gearbox efficiency rating and an overall engine efficiency rating that accounts for the number of rotating low-pressure turbine stages, can further improve the overall engine architecture, while maintaining the improvements to acoustic performance. One way in which the overall engine efficiency rating improves engine architecture is that balances several engine parameters to provide a well-balanced and efficient engine. The overall engine efficiency rating can also, for example, aid in the process of developing a turbomachine engine. The overall gearbox efficiency rating is particularly useful for geared turbofan engines having gear ratios that are less than or equal to 6.0, between 2.5 and 5.0, and in some cases, for gear ratios that are less than or equal to 4.0.

As described herein, combining acoustic spacing and gearbox efficiency can lead to significant improvements in engine performance, noise reduction, and overall efficiency. The inventors have found that these improvements provide improvements that result in a more balanced engine architecture. The interplay between acoustic spacing and gearbox efficiency allows for a balanced engine design. While acoustic spacing focuses on noise reduction, gearbox efficiency ensures that the engine's mechanical components operate effectively, leading to an improved, and more well-rounded, engine architecture. Engines with improved acoustic spacing and gearbox efficiency can achieve a desirable balance between noise emissions and engine size. This balance results in enhanced performance of the engine.

For the example of FIG. 5, the gas turbine engine is a high-bypass turbofan jet engine 300. As shown in FIG. 5, the turbofan engine 300 defines an axial direction A (extending parallel to a longitudinal centerline 302 provided for reference) and a radial direction R (extending perpendicular to the axial direction A). In general, the turbofan 300 includes a fan section 304 and a core engine 306 disposed downstream from the fan section 304. The engine 300 also includes a gear assembly or power gear box 336 having a plurality of gears for coupling a gas turbine shaft to a fan shaft. The position of the power gear box 336 is not limited to that as shown in the example of turbofan 300. For example, the position of the power gear box 336 may vary along the axial direction A.

The exemplary core engine 306 depicted generally includes a substantially tubular outer casing 308 that defines an annular inlet 310. The outer casing 308 encases, in serial flow relationship, a compressor section including a booster or low-pressure (LP) compressor 312 and a high-pressure (HP) compressor 314; a combustion section 316; a turbine section including a high-pressure (HP) turbine 318 and a low-pressure (LP) turbine 320; and a jet exhaust nozzle section 322. A high-pressure (HP) shaft or spool 324 drivingly connects the HP turbine 318 to the HP compressor 314. A low-pressure (LP) shaft or spool 326 drivingly connects the LP turbine 320 to the LP compressor 312. Additionally, the compressor section, combustion section 316, and turbine section together define at least in part a core air flowpath 327 extending therethrough.

A gear assembly of the present disclosure is compatible with standard fans, variable pitch fans, or other configurations. For the example depicted, the fan section 304 may include a variable pitch fan 328 having a plurality of fan blades 330 coupled to a disk 332 in a spaced-apart manner. As depicted, the fan blades 330 extend outwardly from disk 332 generally along the radial direction R. Each fan blade 330 is rotatable relative to the disk 332 about a pitch axis P by virtue of the fan blades 330 being operatively coupled to a suitable actuation member 334 configured to collectively vary the pitch of the fan blades 330. The fan blades 330, disk 332, and actuation member 334 are together rotatable about the longitudinal axis 302 by LP shaft 326 across a gear assembly or power gearbox 336. A gear assembly 336 may enable a speed change between a first shaft, e.g., LP shaft 326, and a second shaft, e.g., LP compressor shaft and/or fan shaft. For example, in some instances the gear assembly 336 may be disposed in an arrangement between a first shaft and a second shaft such as to reduce an output speed from one shaft to another shaft.

More generally, the gear assembly 336 can be placed anywhere along the axial direction A to decouple the speed of two shafts, whenever it is convenient to do so from a component efficiency point of view, e.g., faster LP turbine and slower fan and LP compressor or faster LP turbine and LP compressor and slower fan.

Referring still to the example of FIG. 5, the disk 332 is covered by rotatable front nacelle 338 aerodynamically contoured to promote airflow through the plurality of fan blades 330. Additionally, the exemplary fan section 304 includes an annular fan casing or outer nacelle 340 that circumferentially surrounds the fan 328 and/or at least a portion of the core engine 306. The nacelle 340 is, for the example depicted, supported relative to the core engine 306 by a plurality of circumferentially-spaced outlet guide vanes 342. Additionally, a downstream section 344 of the nacelle 340 extends over an outer portion of the core engine 306 so as to define a bypass airflow passage 346 therebetween.

During operation of the turbofan engine 300, a volume of air 348 enters the turbofan 300 through an associated inlet 350 of the nacelle 340 and/or fan section 304. As the volume of air 348 passes across the fan blades 330, a first portion of the air 348 as indicated by arrows 352 is directed or routed into the bypass airflow passage 346 and a second portion of the air 348 as indicated by arrow 354 is directed or routed into the LP compressor 312. The ratio between the first portion of air 352 and the second portion of air 354 is commonly known as a bypass ratio. The pressure of the second portion of air 354 is then increased as it is routed through the high-pressure (HP) compressor 314 and into the combustion section 316, where it is mixed with fuel and burned to provide combustion gases 356.

The combustion gases 356 are routed through the HP turbine 318 where a portion of thermal and/or kinetic energy from the combustion gases 356 is extracted via sequential stages of HP turbine stator vanes 358 that are coupled to the outer casing 308 and HP turbine rotor blades 360 (e.g., two stage) that are coupled to the HP shaft or spool 324, thus causing the HP shaft or spool 324 to rotate, thereby supporting operation of the HP compressor 314. The combustion gases 356 are then routed through the LP turbine 320 where a second portion of thermal and kinetic energy is extracted from the combustion gases 356 via sequential stages of LP turbine stator vanes 362 that are coupled to the outer casing 308 and LP turbine rotor blades 364 (e.g., four stages) that are coupled to the LP shaft or spool 326, thus causing the LP shaft or spool 326 to rotate, thereby supporting operation of the LP compressor 312 and/or rotation of the fan 328.

It should be noted that a high-pressure turbine (e.g., the HP turbine 318) can, in some examples, comprise one or two rotating blade stages and that a low-pressure turbine (e.g., LP turbine 320) can, in some instances, comprise three, four, five, six, or seven rotating blade stages.

The combustion gases 356 are subsequently routed through the jet exhaust nozzle section 322 of the core engine 306 to provide propulsive thrust. Simultaneously, the pressure of the first portion of air 352 is substantially increased as the first portion of air 352 is routed through the bypass airflow passage 346 before it is exhausted from a fan nozzle exhaust section 366 of the turbofan 300, also providing propulsive thrust. The HP turbine 318, the LP turbine 320, and the jet exhaust nozzle section 322 at least partially define a hot gas path 368 for routing the combustion gases 356 through the core engine 306.

The core engine comprises a compressor section, a combustor section, and a turbine section. The compressor section can include a high-pressure compressor and a booster or a low-pressure compressor. The turbine section can include a high-pressure turbine (e.g., one stage) and a low-pressure turbine 444 (e.g., three stage). The low-pressure compressor is positioned forward of and in flow relationship with the high-pressure compressor. The low-pressure compressor is rotatably coupled with the low-pressure turbine via a low-speed shaft to enable the low-pressure turbine to drive the low-pressure compressor. The low-speed shaft is also operably connected to the gear assembly to provide power to the fan assembly. The high-pressure compressor is rotatably coupled with the high-pressure turbine via a high-speed shaft to enable the high-pressure turbine to drive the high-pressure compressor.

It should be noted that a high-pressure turbine (e.g., the high-pressure turbine) can, in some examples, comprise one or two stages and that a low-pressure turbine (e.g., the low-pressure turbine) can, in some instances, comprise three, four, five, or six rotating blade stages.

Figure 6:
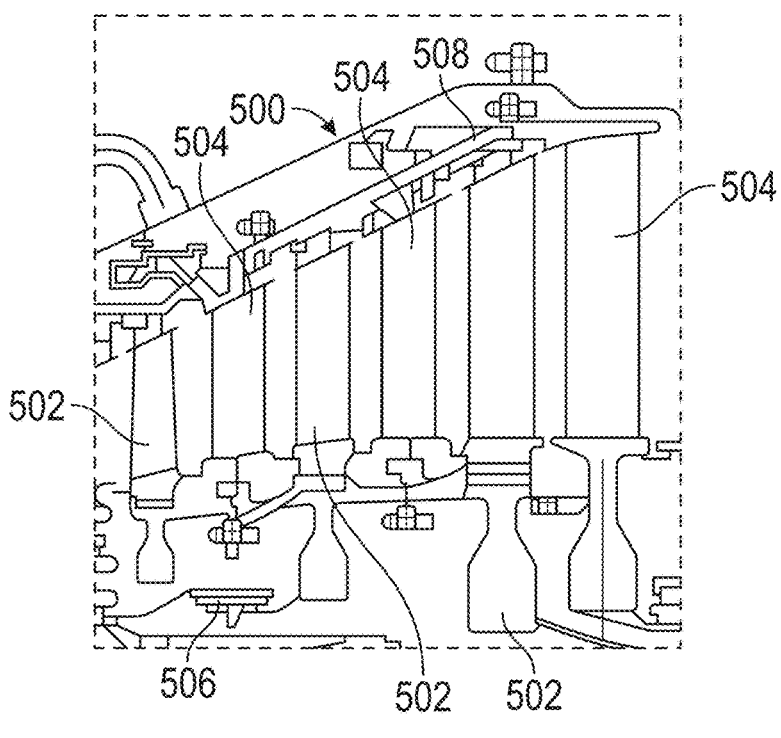
FIG. 6 is a cross-sectional schematic illustration of an example of a counter-rotating low-pressure turbine of a turbomachine engine, the low-pressure turbine having a 3×3 configuration.
Figure 7:
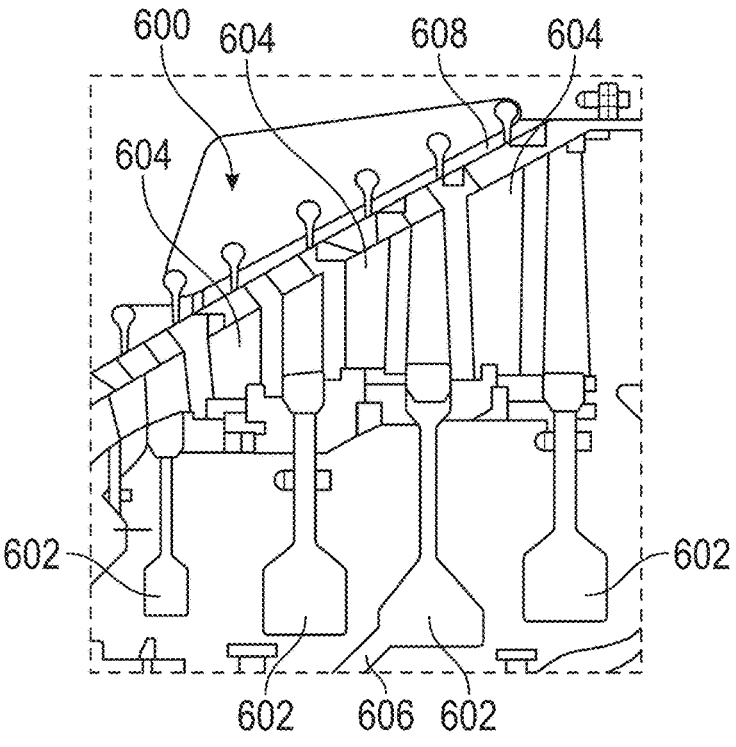
FIG. 7 is a cross-sectional schematic illustration of an example of a counter-rotating low-pressure turbine of a turbomachine engine, the low-pressure turbine having a 4×3 configuration.

In some examples, the engines described herein can comprise a counter-rotating low-pressure turbine. For example, FIGS. 6-7 depict schematic cross-sectional illustrations of counter-rotating low-pressure turbines. In particular, FIG. 6 depicts a counter-rotating turbine 500, and FIG. 7 depicts a counter-rotating turbine 600. The counter-rotating turbines comprise inner blade stages and outer blade stages arranged in an alternating inner-outer configuration. In other words, the counter-rotating turbines do not comprise stator vanes disposed between the blade stages.

Referring to FIG. 6, the counter-rotating turbine 500 comprises a plurality of inner blade stages 502 and a plurality of outer blade stages 504. More specifically, the counter-rotating turbine 500 includes three inner blades stages 502 that are coupled to and extend radially outwardly from an inner shaft 506 (which can also be referred to as "a rotor") and three outer blade stages 504 that are coupled to extend radially inwardly from an outer shaft 508 (which can also be referred to as "a drum"). In this manner, the counter-rotating turbine 500 can be considered a six stage turbine because there are six total rotating blade rows. It should be noted, however, that the counter-rotating turbine 500 would be considered to have three LPT stages, N, for purposes of determining the overall engine efficiency rating described below because there are three inner blade stages 502.

Referring to FIG. 7, the counter-rotating turbine 600 comprises a plurality of inner blade stages 602 and a plurality of outer blade stages 604. More specifically, the counter-rotating turbine 600 includes four inner blades stages 602 that are coupled to and extend radially outwardly from an inner shaft 606 and three outer blade stages 604 that are coupled to extend radially inwardly from an outer shaft 608. In this manner, the counter-rotating turbine 600 can be considered a seven stage turbine because there are seven total rotating blade rows. It should be noted, however, that the counter-rotating turbine 600 would be considered to have four LPT stages, N, for purposes of determining the overall engine efficiency rating described below because there are four inner blade stages 602.

According to some examples, there is a turbomachine characterized by both a high gear ratio and a high power gearbox. A high gear ratio gearbox means a gearbox with a gear ratio of above about 4:1. Examples of a high power gearbox include a gearbox adapted for transmitting power greater than 7 MW with output spool speed above, e.g., 1000 rpm, a gearbox adapted for transmitting power greater than 15 MW with output spool speed of about 1100 rpm, and a gearbox adapted for transmitting power greater than transmitting 22 MW with output spool speed of about 3500 rpm.

Each of the examples of turbomachines disclosed herein can utilize a high gear ratio gearbox. Adopting a gearbox with a high gear ratio presents unique challenges. One such challenge is determining the amount of oil that would need to circulate through the gearbox during operation, i.e., the high gear ratio gearbox's oil flow rate. The oil demand is significant when the engine requires a high gear ratio gearbox. Moreover, the estimated amount of oil flow for the high gear ratio gearbox is not well informed by, or capable of being estimated from, oil flow rates for an existing serviced engine. Starting from this basis, the oil flow demands were calculated for the different engine configurations contemplated and disclosed herein, by consideration of the different features and performance characteristics, e.g., pitch line velocity and constants differentiating one gearbox configuration from another. These efforts accordingly involved factoring in specific characteristics of the gearboxes and the power transmission requirements for the gearbox to estimate the oil flow rates.

During the process of developing the aforementioned examples of turbomachines incorporating a high gear ratio gearbox, it was determined that a good approximation of the high gear ratio gearbox oil flow rate may be made using only a relatively few engine parameters. This development is based on, among other things, the recognition that an oil flow rate through a gearbox is related to the expected power loss when transmitting power across a gearbox. From this initial recognition and other developments that were the by-product of studying several different engine configurations that included a power gearbox (including the configurations disclosed herein), it was determined that a good approximation to the high gear ratio gearbox oil flow rate could be made based on a relationship among the turbomachine's gearbox gear ratio, net thrust, and fan diameter. This relationship is referred to herein as "a gearbox efficiency rating."

The gearbox efficiency rating is quite beneficial. For example, with the gearbox efficiency rating having provided the engine oil flow requirements one can also estimate, for purposes of system integration, the type of oil-related secondary systems (e.g., sump, oil circuit, heat sinks, etc.) that would be included to support proper functioning of the selected high gear ratio gearbox; and/or to provide guidance on whether a particular engine architecture is beneficial or not, without requiring an entire team to complete the tedious and time-consuming process of developing a new gearbox from scratch. Therefore, the gearbox efficiency rating can improve the process of developing a turbomachine engine, which can ultimately result in an improved turbomachine. Values for the gearbox efficiency rating identify key engine requirements affecting the overall architecture. An engine architecture based, at least in part, on this value, can enable early optimization of major engine components, thereby benefiting the overall architecture. By basing an engine design on a gearbox efficiency rating, it is more likely to find the optimized architecture than versus a design on experiment. The GER enables discovery of a better design for this reason, rather than relying on chance that the optimal solution is found from a design of experiments involving a large number of variables whose interrelationships are not clearly known or understood.

As indicated, the gearbox efficiency rating is a relationship based on a turbomachine's fan diameter (D), net thrust (T), and gear ratio of a high gear ratio gearbox. The gear efficiency rating, valid for ducted engines with gear ratios between about 4:1 and 7:1, may be expressed as $$Q\left(\frac{D^{1.56}}{T}\right)^{1.53},$$

where Q is measured at an inlet of the gearbox in gallons per minute at a max takeoff condition, D is measured in inches, and T is measured in pounds force at the max takeoff condition. In this manner, the gearbox efficiency rating defines a specific turbomachine engine configuration.

As used herein "net thrust" (T) equals the change of momentum of the bypass airflow plus the change of momentum of the core airflow and the burned fuel. Or stated another way, $T = W_{byp} (V_{byp} - V_0) + (W_{core} + W_{fuel}) V_{core} - W_{core} V_0$, where $W_{byp}$ is the mass flow rate of air of the bypass airflow, $V_{byp}$ is the velocity of the bypass airflow, $V_0$ is the flight velocity, $W_{core}$ is the mass flow rate of air of the core airflow, $W_{fuel}$ is the mass flow rate of the burned fuel, and $V_{core}$ is the velocity of the core airflow.

As indicated earlier, turbomachine engines, such as the turbofan engines 100, 200, 300, 400, comprise many variables and factors that affect their performance and/or operation. The interplay between the various components can make it particularly difficult to develop or select one component, especially when each of the components is at a different stage of completion. For example, one or more components may be nearly complete, yet one or more other components may be in an initial or preliminary phase where only one (or a few) parameters is known. Also, each component is subject to change often more than once over the development period, which can often last for many years (e.g., 5-15 years). These complex and intricate individual and collective development processes can be cumbersome and inefficient. For at least these reasons, there is a need for devices and methods that can provide a good estimate of, not only the basic configuration or sizing needed to achieve the desired performance benefits, but also to reflect the penalties or accommodations in other areas in order to realize the desired benefits. This leads to an improved, more optimally designed engine.

According to another aspect of the disclosure, the gearbox efficiency rating may additionally provide a particularly useful indication of the efficiency and effectiveness of the engine during initial development, e.g., as a tool to accept or reject a particular configuration. Thus, the gearbox efficiency rating can be used, for example, to guide gearbox development. For example, the gearbox efficiency rating can be used to quickly and accurately determine the size of the gearbox that is suitable for a particular engine without requiring an individual or team to complete the tedious and time-consuming process of developing the gearbox from scratch. Therefore, the gearbox efficiency rating can also improve the process of developing a turbomachine engine.

As further explained below, the inventors also discovered that modification of the gearbox efficiency rating accounting for the number of rotating low-pressure turbine stages, referred to as overall engine efficiency rating, could also improve the overall engine architecture. One way in which the overall engine efficiency rating improves engine architecture is that balances several engine parameters to provide a well-balanced and efficient engine. The overall engine efficiency rating can also, for example, aid in the process of developing a turbomachine engine. The overall gearbox efficiency rating can be particularly useful for geared turbofan engines comprising a gear ratio that is less than or equal to 5.0, or in some cases 4.0, for ducted, geared turbofan engines.

In some examples, the gearbox efficiency rating of a turbomachine engine is within a range of about 0.10-1.8 or 0.19-1.8 or 0.10-0.70. In certain examples, the gearbox efficiency rating is within a range of about 0.10-0.62 or about 0.21-0.51. FIG. 8 provides the gear efficiency rating of several exemplary engines, including the gear ratio, oil flow, fan diameter, net thrust, and gearbox efficiency ratings for multiple exemplary turbomachine engines.

Since a gearbox is used as a speed reducer or increaser in transmitting power from component to component, gearbox efficiency is of primary importance. Various dynamic issues invariably will arise during the extended operation of the power gearbox. Accordingly, the ability of the bearings to tolerate and mitigate these dynamic issues can improve the capacity, life, and reliability of the power gearbox and thereby lower the frequency of the engine maintenance. Additionally, providing proper lubrication and cooling to the bearings and/or other gearbox components is necessary to maximize the life and load capacity gearbox. Thus, any changes to the engine architecture (e.g., fan diameter) must not adversely affect proper lubrication and cooling to the gearbox. The gearbox efficiency rating takes this into account and provides an engine configuration with proper oil flow rate. As such, the gearbox efficiency rating can, for example, provide an engine with improved gearbox efficiency and/or increased longevity.

In some examples, the oil flow rate Q is within a range of about 5-55 gallons per minute. In certain examples, the oil flow rate Q is within a range of about 5.5-25 gallons per minute. In other examples, the oil flow rate Q is within a range of about 25-55 gallons per minute. In other examples, the oil flow rate Q is within a range of about 25-40 gallons per minute. In other examples, the oil flow rate Q is within a range of about 20-30 gallons per minute. In other examples, the oil flow rate Q is within a range of about 25-35 gallons per minute. FIGS. 8 and 17 also provides the oil flow rates of several exemplary engines.

As noted above, the oil flow rate Q is measured at an inlet of the gearbox in gallons per minute at a max takeoff condition. The inlet of the gearbox is the location at which the oil enters the gearbox from the oil supply line. As used herein "a max takeoff condition" means sea-level elevation, standard pressure, extreme hot day temperature, and a flight velocity of up to about 0.25 Mach.

As used herein, the term "extreme hot day temperature" means the extreme hot day temperature specified for a particular engine. This can include the extreme hot day temperature used for engine certification. Extreme hot day temperature can additionally or alternatively include temperatures of about 130-140° F.

In some examples, the fan diameter D is about 70-100 inches. In certain examples, the fan diameter D is about 78-90 inches. FIG. 8 also provides the fan diameter of several exemplary engines.

In some examples, the net thrust T of the engine is within a range of about 12,000-35,000 pounds force. In particular examples, the net thrust T of the engine is within a range of about 15,000-30,000 pounds force. FIG. 8 also provides the net thrust of several exemplary engines.

In some examples, the gearbox efficiency rating of a turbomachine engine can be configured in relation to the gear ratio (GR) of the gearbox. For example, in certain instances, a turbomachine engine can be configured such that the gearbox efficiency rating is greater than 0.015 $(GR^{1.4})$ and less than $0.034(GR^{1.5})$. In other examples, a turbomachine engine can be configured such that the gearbox efficiency rating is greater than $0.02625(GR^{1.4})$ and less than $0.042(GR^{1.4})$.

For example, FIG. 8 depicts several exemplary engines with gearbox efficiency ratings that satisfy these relationships. Engine 1, Engine 2, and Engine 3 are turbomachine engines comprising gearboxes with a gear ratio of 7:1 and the gearbox efficiency ratings within a range of 0.23-0.63, that is 0.51, 0.42, and 0.41, respectively. Engine 4 is a turbomachine engine comprising a gearbox with a gear ratio of 5.1:1 and a gearbox efficiency rating within a range of 0.15-0.39, specifically 0.29. Engine 5 is a turbomachine engine comprising a gearbox with a gear ratio of 4.1:1 and a gearbox efficiency rating within a range of 0.11-0.28, specifically 0.21. Engines 6-10 provide additional examples with specific gearbox efficiency ratings. Ranges for the gearbox efficiency ratings of Engines 6-10 can be determined using the equations above.

As another example, a turbomachine engine comprising a gearbox with a gear ratio of 4.5:1 can be configured such that the gearbox efficiency rating is within a range of 0.12-0.32. As another example, a turbomachine engine comprising a gearbox with a gear ratio of 6:1 can be configured such that the gearbox efficiency rating is within a range of 0.18-0.50.

In some instances, a turbomachine engine can comprise a gearbox with a gear ratio of 4-7, or 4-5, or 5-6. Below is a table with an exemplary gearbox efficiency rating.

| Gear Ratio | Gearbox Efficiency Rating |
|---|---|
| 4.1-6.9 | 0.10-0.62 |

In some examples, a turbomachine engine can be configured such that the gearbox efficiency rating is greater than $0.023(GR^{1.5})$ and less than $0.034(GR^{1.5})$. In particular instances, the gearbox efficiency rating can be about 0.0275 $(GR^{1.5})$. These configurations can be particularly advantageous, for example, with engines comprising an epicyclic gearbox (e.g., star and/or planet configuration).

| Gear Ratio | Gearbox Efficiency Rating |
|---|---|
| 4.1-6.9 | 0.19-0.62 |

In other examples, a turbomachine engine can be configured such that the gearbox efficiency rating is greater than $0.015(GR^{1.4})$ and less than $0.025(GR^{1.4})$. In particular instances, the gearbox efficiency rating can be about 0.02 $(GR^{1.4})$. These configurations can be particularly advantageous, for example, with engines comprising a non-epicyclic gearbox (e.g., compound gearboxes).

| Gear Ratio | Gearbox Efficiency Rating |
|---|---|
| 4.1-6.9 | 0.10-0.37 |

It should be noted gearbox efficiency rating values disclosed herein are approximate values. Accordingly, the disclosed gearbox efficiency rating values include values within five percent of the listed values.

As noted above, the gearbox efficiency rating can define a specific engine configuration and/or can be used when developing a gearbox for a turbomachine engine. For example, in some instances, the gearbox efficiency rating can be used to determine the size and/or oil flow rate of a gearbox. Assuming that a desired gear ratio of the gearbox is known, along with the fan diameter, and the net thrust of the engine, the gearbox efficiency ratings can be used to determine an acceptable oil flow rate. In some examples, the equation below can be used to determine an acceptable range of oil flow rates (Q) for the gearbox. The determined oil flow rate Q can be used, for example, to aid in the configuration of the gearbox, thereby leading to an improved gearbox and the overall engine. In some instances, one or more other parameters (e.g., the gearbox efficiency rating) can also aid in the configuration of the gearbox.

$$\frac{0.015\left(GR^{1.4}\right)}{\left(\frac{D^{1.56}}{T}\right)^{1.53}} < Q < \frac{0.034\left(GR^{1.5}\right)}{\left(\frac{D^{1.56}}{T}\right)^{1.53}}$$

Figure 9:
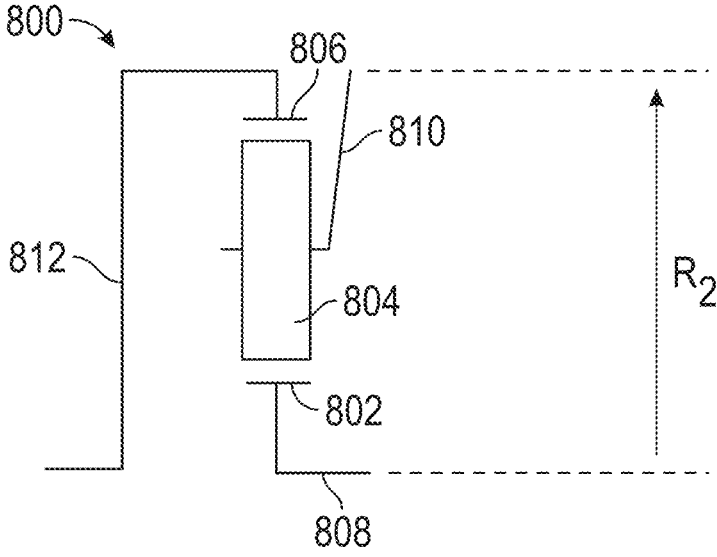
FIG. 9 is a cross-sectional schematic illustration of an example of a gearbox configuration for a turbomachine engine.

FIG. 9 schematically depicts a gearbox 800 that comprises a single-stage star configuration. The gearbox 800 includes a sun gear 802, a carrier 804 housing a plurality of star gears (e.g., 3-5 star gears), and a ring gear 806. The sun gear 802 can mesh with the star gears, and the star gears can mesh with the ring gear 806. The sun gear 802 can be coupled to a low-speed shaft 808, which in turn is coupled to the low-pressure turbine of Engine 2. The carrier 804 can be fixed from rotation by a support member 810. The ring gear 806 can be coupled to a fan shaft 812.

Based on the configuration of the gearbox 800 and the calculated oil flow rate of 4-13 gallons per minute, which is based on the gearbox efficiency rating, the gearbox 800 can comprise a radius $R_2$. The size of the gearbox, including the radius $R_2$, can be configured such that the oil flow rate at the inlet of the gearbox 800 at a max takeoff condition is 7-13 gallons per minute (e.g., 10.1 gpm). In some examples, the radius $R_2$ of the gearbox 800 can be about 18-23 inches. In other examples, the radius $R_2$ of the gearbox 700 can be smaller than 18 inches or larger than 23 inches.

As an example, Engine 2 (FIG. 8) comprises a 3-7 stage low-pressure turbine. The desired gear ratio for the gearbox of Engine 2 is about 7:1. Based on this information, oil flow rate Q of the gearbox of Engine 2 should be about 3-9 gallons per minute or about 5-9 gallons per minute (e.g., 6 gpm) at a max takeoff condition.

Figure 10:
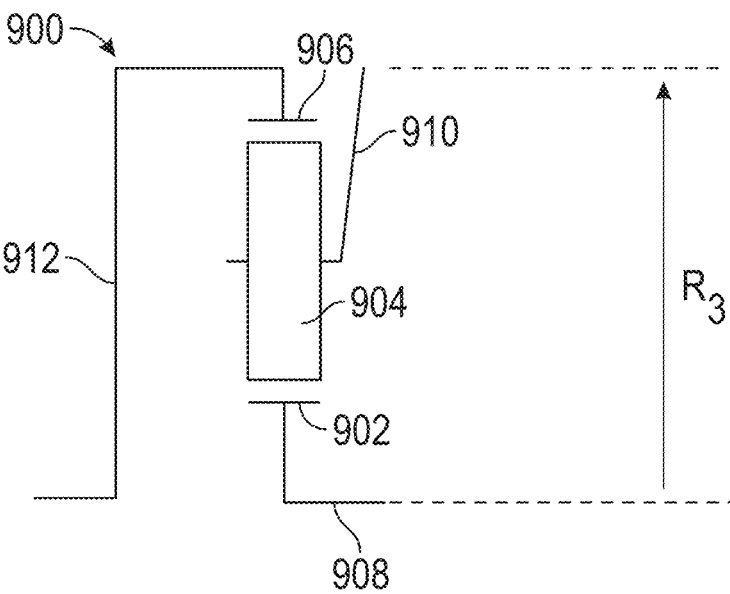
FIG. 10 is a cross-sectional schematic illustration of an example of a gearbox configuration for a turbomachine engine.

FIG. 10 schematically depicts a gearbox 900 that can be used, for example, with Engine 2. The gearbox 800 comprises a single-stage star configuration. The gearbox 900 includes a sun gear 902, a carrier 904 housing a plurality of star gears (e.g., 3-5 star gears), and a ring gear 906. The sun gear 902 can mesh with the star gears, and the star gears can mesh with the ring gear 906. The sun gear 902 can be coupled to a low-speed shaft 908, which in turn is coupled to the low-pressure turbine of Engine 2. The carrier 904 can be fixed from rotation by a support member 910. The ring gear 906 can be coupled to a fan shaft 912.

Based on the configuration of the gearbox 900 and the calculated oil flow rate of 5-9 gallons per minute, which is based on the gearbox efficiency rating, the gearbox 900 can comprise a radius $R_3$. The size of the gearbox, including the radius $R_3$, can be configured such that the oil flow rate at the inlet of the gearbox 900 at a max takeoff condition is 3-9 gallons per minute (e.g., 6 gpm). In some examples, the radius $R_3$ of the gearbox 900 can be about 10-13 inches. In other examples, the radius $R_3$ of the gearbox 900 can be smaller than 10 inches or larger than 13 inches.

Engine 3 comprises a counter-rotating low-pressure turbine. The desired gear ratio for the gearbox of Engine 3 is about 7:1. Based on this information, oil flow rate Q of the gearbox of Engine 3 should be about 4-13 gallons per minute or about 7-13 gallons per minute (e.g., 8.1 gpm) at a max takeoff condition.

Thus, as illustrated by the examples disclosed herein, a gearbox efficiency rating can characterize or define a specific engine and/or gearbox configuration. As such, turbomachine engines can be quickly and accurately configured by utilizing the gearbox efficiency rating and/or its related parameters. In this manner, the gearbox efficiency rating disclosed herein provides one or more significant advantages over known turbomachine engines and/or known methods of developing turbomachine engines.

Configurations of the gear assemblies depicted and described herein may provide for gear ratios and arrangements that fit within the L/D$_{core}$ constraints of the disclosed engines. In certain examples, the gear assemblies depicted and described allow for gear ratios and arrangements providing for rotational speed of the fan assembly corresponding to one or more ranges of cruise altitude and/or cruise speed provided above.

Various exemplary gear assemblies are shown and described herein. These gear assemblies may be utilized with any of the exemplary engines and/or any other suitable engine for which such gear assemblies may be desirable. In such a manner, it will be appreciated that the gear assemblies disclosed herein may generally be operable with an engine having a rotating element with a plurality of rotor blades and a turbomachine having a turbine and a shaft rotatable with the turbine. With such an engine, the rotating element may be driven by the shaft of the turbomachine through the gear assembly.

Although the exemplary gear assemblies shown are mounted at a forward location (e.g., forward from the combustor and/or the low-pressure compressor), in other examples, the gear assemblies described herein can be mounted at an aft location (e.g., aft of the combustor and/or the low-pressure turbine).

Figure 11:
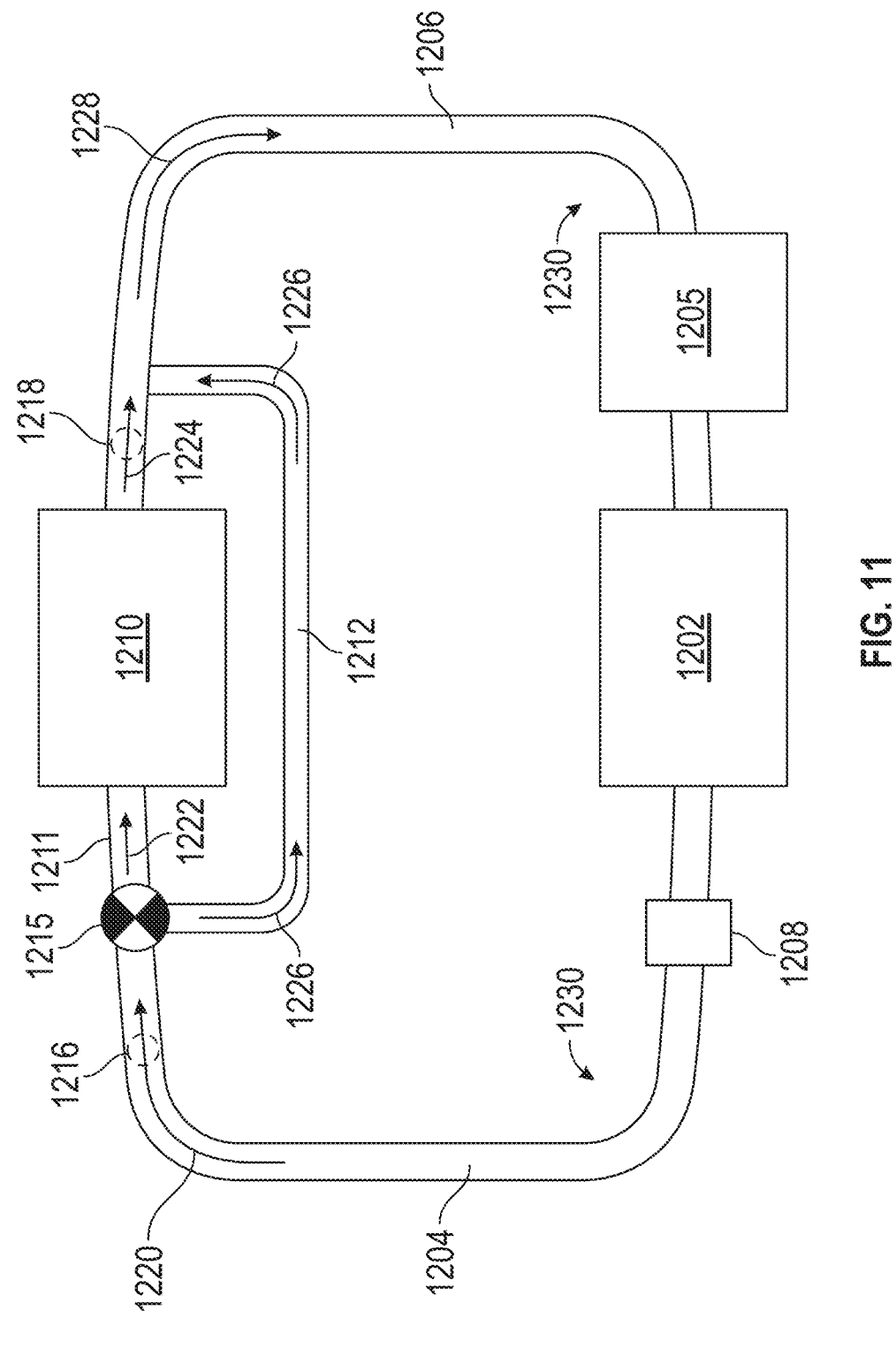
FIG. 11 is a schematic diagram of an exemplary lubricant system supplying lubricant to an engine component.

Portions of a lubricant system 1200 are depicted schematically in FIG. 11. The lubrication system 1200 can be a component of the turbomachine engines disclosed herein and/or can be coupled to the various gearboxes disclosed herein. A series of lubricant conduits 1203 can interconnect multiple elements of the lubricant system 1200 and/or engine components, thereby providing for provision or circulation of the lubricant throughout the lubricant system and any engine components coupled thereto (e.g., a gearbox, bearing compartments, etc.).

It should be understood that the organization of the lubricant system 1200 as shown is by way of example only to illustrate an exemplary system for a turbomachine engine for circulating lubricant for purposes such as lubrication or heat transfer. Any organization for the lubricant system 1200 is contemplated, with or without the elements as shown, and/or including additional elements interconnected by any necessary conduit system.

Referring again to FIG. 11, the lubricant system 1200 includes a lubricant reservoir 1202 configured to store a coolant or lubricant, including organic or mineral oils, synthetic oils, or fuel, or mixtures or combinations thereof. A supply line 1204 and a scavenge line 1206 are fluidly coupled to the reservoir 1202 and collectively form a lubricant circuit to which the reservoir 1202 and component 1210 (e.g., a gearbox) can be fluidly coupled. The component 1210 can be supplied with lubrication by way of a fluid coupling with the supply line 1204 and can return the supplied lubricant to the reservoir 1202 by fluidly coupling to the scavenge line 1206. More specifically, a component supply line 1211 can be fluidly coupled between the supply line 1204 and the component 1210. It is further contemplated that multiple types of lubricant can be provided in other lines not explicitly shown but are nonetheless included in the lubricant system 1200.

Optionally, at least one heat exchanger 1205 can be included in the lubricant system 1200. The heat exchanger 1205 can include a fuel/lubricant (fuel-to-lubricant) heat exchanger, an oil/lubricant heat exchanger, an air-cooled oil cooler, and/or other means for exchanging heat. For example, a fuel/lubricant heat exchanger can be used to heat or cool engine fuel with lubricant passing through the heat exchanger. In another example, a lubricant/oil heat exchanger can be used to heat or cool additional lubricants passing within the turbomachine engine, fluidly separate from the lubricant passing along the lubricant system 1200. Such a lubricant/oil heat exchanger can also include a servo/lubricant heat exchanger. Optionally, a second heat exchanger (not shown) can be provided along the exterior of the core engine, downstream of the outlet guide vane assembly. The second heat exchanger can be an air/lubricant heat exchanger, for example, adapted to convectively cool lubricant in the lubricant system 1200 utilizing the airflow passing through an outlet guide vane assembly of the turbomachine engine.

A pump 1208 can be provided in the lubricant system 1200 to aid in recirculating lubricant from the reservoir 1202 to the component 1210 via the supply line 1204. For example, the pump 1208 can be driven by a rotating component of the turbine engine 10, such as a high-pressure shaft or a low-pressure shaft of a turbomachine engine.

Lubricant can be recovered from the component 1210 by way of the scavenge line 1206 and returned to the reservoir 1202. In the illustrated example, the pump 1208 is illustrated along the supply line 1204 downstream of the reservoir 1202. The pump 1208 can be located in any suitable position within the lubricant system 1200, including along the scavenge line 1206 upstream of the reservoir 1202. In addition, while not shown, multiple pumps can be provided in the lubricant system 1200.

In some examples, a bypass line 1212 can be fluidly coupled to the supply line 1204 and scavenge line 1206 in a manner that bypasses the component 1210. In such examples, a bypass valve 1215 is fluidly coupled to the supply line 1204, component supply line 1211, and bypass line 1212. The bypass valve 1215 is configured to control a flow of lubricant through at least one of the component supply line 1211 or the bypass line 1212. The bypass valve 1215 can include any suitable valve including, but not limited to, a differential thermal valve, rotary valve, flow control valve, and/or pressure safety valve. In some examples, a plurality of bypass valves can be provided.

During operation, a supply flow 1220 can move from the reservoir 1202, through the supply line 1204, and to the bypass valve 1215. A component input flow 1222 can move from the bypass valve 1215 through the component supply line 1211 to an inlet of the component 1210. A scavenge flow 1224 can move lubricant from an outlet of the component 1210 through the scavenge line 1206 and back to the reservoir 1202. Optionally, a bypass flow 1226 can move from the bypass valve 1215 through the bypass line 1212 and to the scavenge line 1206. The bypass flow 1226 can mix with the scavenge flow 1224 and define a return flow 1228 moving toward the lubricant reservoir 1202.

In one example where no bypass flow exists, it is contemplated that the supply flow 1220 can be the same as the component input flow 1222 and that the scavenge flow 1224 can be the same as the return flow 1228. In another example where the bypass flow 1226 has a nonzero flow rate, the supply flow 1220 can be divided at the bypass valve 1215 into the component input flow 1222 and bypass flow 1226. It will also be understood that additional components, valves, sensors, or conduit lines can be provided in the lubricant system 1200, and that the example shown in FIG. 14 is simplified with a single component 1210 for purposes of illustration.

The lubricant system 1200 can further include at least one sensing position at which at least one lubricant parameter can be sensed or detected. The at least one lubricant parameter can include, but is not limited to, a flow rate, a temperature, a pressure, a viscosity, a chemical composition of the lubricant, or the like. In the illustrated example, a first sensing position 1216 is located in the supply line 1204 upstream of the component 1210, and a second sensing position 1218 is located in the scavenge line 1206 downstream of the component 1210.

In one example, the bypass valve 1215 can be in the form of a differential thermal valve configured to sense or detect at least one lubricant parameter in the form of a temperature of the lubricant. In such a case, the fluid coupling of the bypass valve 1215 to the first and second sensing positions 1216, 1218 can provide for bypass valve 1215 sensing or detecting the lubricant temperature at the sensing positions 1216, 18 as lubricant flows to or from the bypass valve 1215. The bypass valve 1215 can be configured to control the component input flow 1222 or the bypass flow 1226 based on the sensed or detected temperature.

It is contemplated that the bypass valve 1215, supply line 1204, and bypass line 1212 can at least partially define a closed-loop control system for the component 1210. As used herein, a "closed-loop control system" will refer to a system having mechanical or electronic components that can automatically regulate, adjust, modify, or control a system variable without manual input or other human interaction. Such closed-loop control systems can include sensing components to sense or detect parameters related to the desired variable to be controlled, and the sensed or detected parameters can be utilized as feedback in a "closed loop" manner to change the system variable and alter the sensed or detected parameters back toward a target state. In the example of the lubricant system 1200, the bypass valve 1215 (e.g., mechanical or electrical component) can sense a parameter, such as a lubricant parameter (e.g., temperature), and automatically adjust a system variable, e.g., flow rate to either or both of the bypass line 1212 or component 1210, without need of additional or manual input. In one example, the bypass valve can be automatically adjustable or self-adjustable such as a thermal differential bypass valve. In another example, the bypass valve can be operated or actuated via a separate controller. It will be understood that a closed-loop control system as described herein can incorporate such a self-adjustable bypass valve or a controllable bypass valve.

Figure 12:
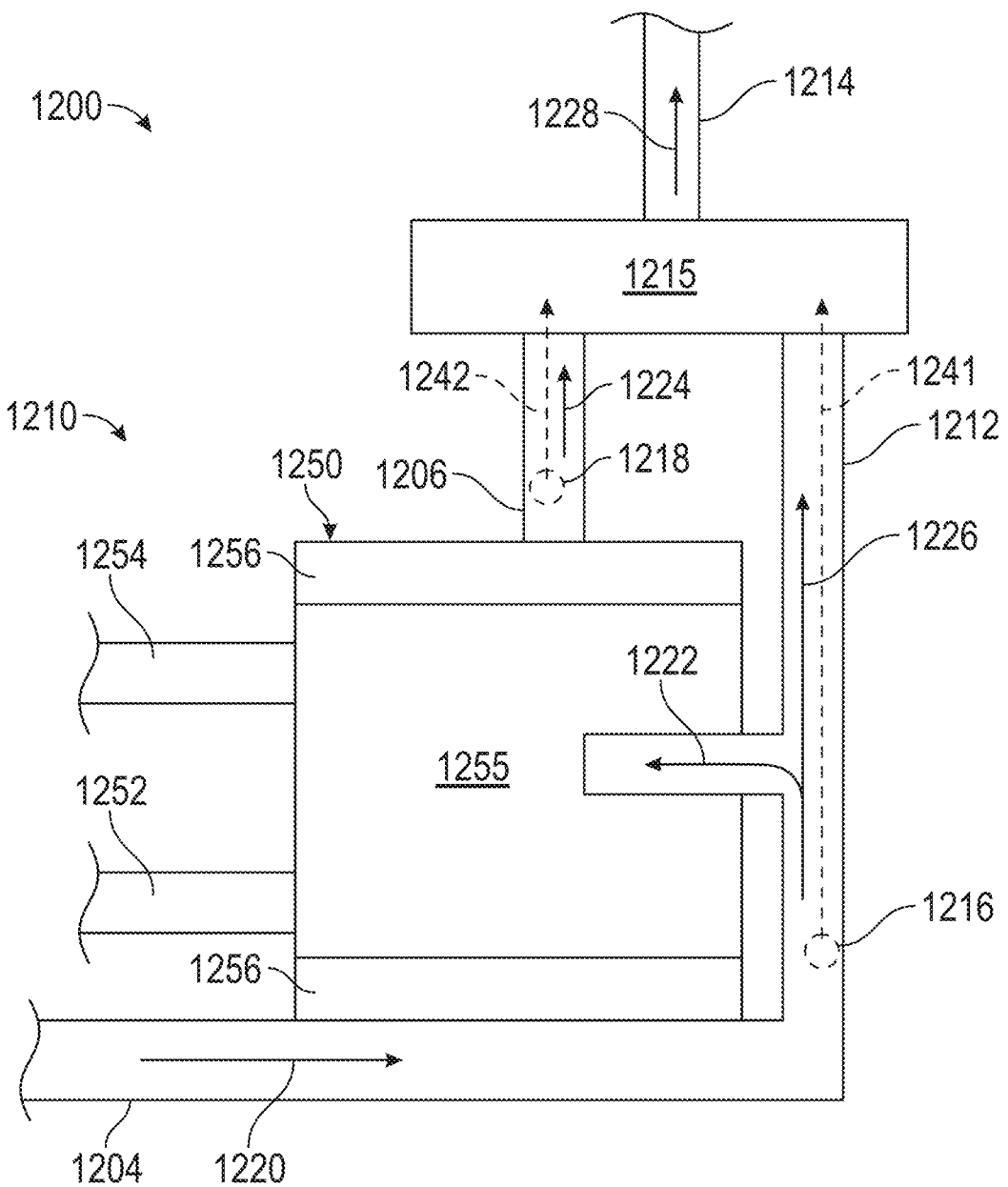
FIG. 12 is a schematic diagram of the lubricant system configured to supply lubricant to a gearbox.

Turning to FIG. 12, a portion of the lubricant system 1200 is illustrated supplying lubricant to a particular component 1210 in the form of a gearbox 1250 within a turbomachine engine. The gearbox can be any of the gearboxes disclosed herein. The gearbox 1250 can include an input shaft 1252, an output shaft 1254, and a gear assembly 1255. In one example, the gear assembly 1255 can be in the form of an epicyclic gear assembly as known in the art having a ring gear, sun gear, and at least one planet/star gear. An outer housing 1256 can at least partially surround the gear assembly 1255 and form a structural support for the gears and bearings therein. Either or both of the input and output shafts 1252, 1254 can be coupled to the turbomachine engine. In one example, the input and output shafts 1252, 1254 can be utilized to decouple the speed of the low-pressure turbine from the low-pressure compressor and/or the fan, which can, for example, improve engine efficiency.

The supply line 1204 can be fluidly coupled to the gearbox 1250, such as to the gear assembly 1255, to supply lubricant to gears or bearings to the gearbox 1250 during operation. The scavenge line 1206 can be fluidly coupled to the gearbox 1250, such as to the gear assembly 1255 or outer housing 1256, to collect lubricant. The bypass line 1212 can be fluidly coupled to the bypass valve 1215, supply line 1204, and scavenge line 1206 as shown. A return line 1214 can also be fluidly coupled to the bypass valve 1215, such as for directing the return flow 1228 to the lubricant reservoir 1202 for recirculation. While not shown in FIG. 12 for brevity, the lubricant reservoir 1202, the heat exchanger 1205, and/or the pump 1208 (FIG. 11) can also be fluidly coupled to the gearbox 1250. In this manner, the supply line 1204, bypass line 1212, scavenge line 1206, and return line 1214 can at least partially define a recirculation line 1230 for the lubricant system 1200.

The supply flow 1220 divides at the bypass line into the component input flow 1222 and the bypass flow 1226. In the example shown, the bypass valve 1215 is in the form of a differential thermal valve that is fluidly coupled to the first and second sensing positions 1216, 1218.

Lubricant flowing proximate the first and second sensing positions 1216, 1218 provides the respective first and second outputs 1241, 1242 indicative of the temperature of the lubricant at those sensing positions 1216, 1218. It will be understood that the supply line 1204 is thermally coupled to the bypass line 1212 and bypass valve 1215 such that the temperature of the fluid in the supply line 1204 proximate the first sensing position 1216 is approximately the same as fluid in the bypass line 1212 adjacent the bypass valve 1215. Two values being "approximately the same" as used herein will refer to the two values not differing by more than a predetermined amount, such as by more than 20%, or by more than 5 degrees, in some examples. In this manner, the bypass valve 1215 can sense the lubricant temperature in the supply line 1204 and scavenge line 1206 via the first and second outputs 1241, 1242. It can be appreciated that the bypass line 1212 can form a sensing line for the valve 1215 to sense the lubricant parameter, such as temperature, at the first sensing position 1216.

During operation of the turbomachine engine, the lubricant temperature can increase within the gearbox 1250, such as due to heat generation of the gearbox 1250, and throughout the lubricant system 1200. In one example, if a lubricant temperature exceeds a predetermined threshold temperature at either sensing position 1216, 1218, the bypass valve 1215 can automatically increase the component input flow 1222, e.g., from the supply line 1204 to the gearbox 1250, by decreasing the bypass flow 1226. Such a predetermined threshold temperature can be any suitable operating temperature for the gearbox 1250, such as about 300° F. in some examples. Increasing the component input flow 1222 can provide for cooling of the gearbox 1250, thereby reducing the lubricant temperature sensed in the various lines 1204, 1206, 1212, 1214 as lubricant recirculates through the lubricant system 1200.

In another example, if a temperature difference between the sensing positions 1216, 1218 exceeds a predetermined threshold temperature difference, the bypass valve can automatically increase the component input flow 1222 by decreasing the bypass flow 1226. Such a predetermined threshold temperature difference can be any suitable operating temperature for the gearbox 1250, such as about 70° F., or differing by more than 30%, in some examples. In yet another example, if a temperature difference between the sensing positions 1216, 1218 is below the predetermined threshold temperature difference, the bypass valve can automatically decrease the component input flow 1222 or increase the bypass flow 1226. In this manner the lubricant system 1200 can provide for the gearbox to operate with a constant temperature difference between the supply and scavenge lines 1204, 1206.

Starting from the basis of the gearbox efficiency rating, the inventors set out to determine whether the gearbox efficiency rating (and/or its components) could be used to aid in the process of developing and/or apply to a geared turbofan engine comprising a relatively low gear ratio (e.g., a gear ratio less than or equal to 4.0—e.g., 2.0-4.0). After numerous attempts and analyzing a multitude of engine parameters and engine configurations, the inventors discovered that the gearbox efficiency rating, when taken together with the stage count of the low-pressure turbine, can in some cases provide an improved engine configuration compared to an engine configuration based only on gearbox efficiency rating, particularly for engines comprising a gear ratio less than or equal to 4.0 (e.g., 2.0-4.0). More precisely, the inventors discovered an overall engine efficiency rating, which is a relationship between the gearbox (i.e., the oil flow "Q"), the fan (i.e., the fan diameter "D"), the power output (i.e., the net thrust "T"), and the low-pressure turbine (i.e., the number of LPT stages "N"). The overall engine efficiency rating can in some cases identify a more holistic engine configuration, which can, for example, improve the efficiency of the engine. In addition to an improved overall engine configuration, the overall engine efficiency rating can in some instances be used to guide an engine development process.

The overall engine efficiency, valid for gear ratios within a range of 2.0-4.0, is defined as $$Q\left(\frac{D^{1.56}}{T}\right)^{1.53} N^2,$$

where Q is a gearbox oil flow rate at an inlet of the gearbox measured in gallons per minute at a max takeoff condition, D is a diameter of the fan blades measured in inches, T is a net thrust of the turbomachine engine measured in pounds force at the max takeoff condition, and N is a number of rotating blade stages of the low-pressure turbine. This newly developed engine parameter can, for example, aid in the process of developing a turbomachine because it considers parameters of a turbofan engine and provides a good approximation of an engine's overall efficiency early on in development. Values for the overall engine efficiency rating identify key engine requirements affecting the overall architecture, in a similar manner as the gearbox efficiency rating discussed earlier. The overall engine efficiency rating however may be a more insightful value to identify an optimal solution because, in addition to the oil flow, the overall engine efficiency rating factors in the effects on architecture when the number of LPT stages are increased or decreased. When there is an increase in the number of LPT stages the turbine efficiency improves, but there is a weight penalty. It may be necessary to balance the number of LPT stages against the size of the gearbox, oil flow needs to the gearbox, and/or size of the fan. An engine architecture based, at least in part, on a value dependent on both the gearbox and LPT, can similarly enable early optimization of major engine components, thereby benefiting the overall architecture. By basing an engine design on an overall engine efficiency rating, it is more likely to find the optimized architecture than versus a design of experiment. The overall engine efficiency rating enables improved engine configurations for this reason, rather than relying on chance that the optimal solution is found from a design of experiments involving a large number of variables whose interrelationships are not clearly known or understood.

As noted above, turbomachine engines, such as the turbofan engines 100, 200, 300, 400, comprise many variables and factors that affect their performance and/or operation. The interplay between the various components can make it particularly difficult to develop or select one component, especially when each of the components is at a different stage of completion. For example, one or more components may be nearly complete, yet one or more other components may be in an initial or preliminary phase where only one (or a few) parameters is known. Also, each component is subject to change often more than once over the development period, which can often last for many years (e.g., 5-15 years). These complex, intricate individual and collective development processes can be cumbersome and inefficient. For at least these reasons, the overall engine efficiency rating can provide a good estimate of, not only the basic configuration or sizing needed to achieve the desired performance benefits, but also to reflect the penalties or accommodations in other areas in order to realize the desired benefits.

According to another aspect of the disclosure, the overall engine efficiency rating may additionally provide a particularly useful indication of the efficiency and effectiveness of the engine during initial development, e.g., as a tool to accept or reject a particular configuration. Thus, the overall engine efficiency rating can be used, for example, to turbofan engine development. For example, the overall engine efficiency rating can be used to quickly and accurately determine parameters (e.g., the size of the gearbox, the number of LPT stages, and/or size of the fan) that are suitable for a particular engine without requiring an individual or team to complete the tedious and time-consuming process of developing the entire engine or a component from scratch. In this manner, the overall engine efficiency rating can also improve the process of developing a turbomachine engine.

The overall engine efficiency rating can be particularly advantageous in developing ducted geared turbofan engines. For example, the overall engine efficiency rating can be utilized for the ducted geared turbofan engines 300 and 400 disclosed herein.

It should be noted that the number of LPT stages (N) of a low-pressure turbine for purposes of the determining the overall engine efficiency rating of a turbofan engine defined as the number of rotating blade stages (or rotors) of the low-pressure turbine for a low-pressure turbine that includes blade (rotor) and vane (stator) rows. When the low-pressure turbine is a counter-rotating turbine (i.e., without vanes between adjacent rotating blade rows), the number of LPT stages (N) is the number of inner blade stages (as opposed to outer blade stages or total rotating stages). For example, referring to FIG. 5, the counter-rotating low-pressure turbine 500 has three inner blade stages 502, and thus "N" equals three when determining the overall engine efficiency for an engine comprising the counter-rotating low-pressure turbine 500. For example, referring to FIG. 6, the counter-rotating low-pressure turbine 600 has four inner blade stages 602, and thus "N" equals four when determining the overall engine efficiency for an engine comprising the counter-rotating low-pressure turbine 600.

In some examples, the overall engine efficiency rating can be greater than or equal to $0.1\mathrm{GR}^{1.5}$ and less than or equal to $\mathrm{GR}^{1.5}$, where GR is the gear ratio. For example, FIGS. 16A-18B depict various ranges of the overall engine efficiency rating and the gear ratio that satisfy this relationship.

Figure 13A:
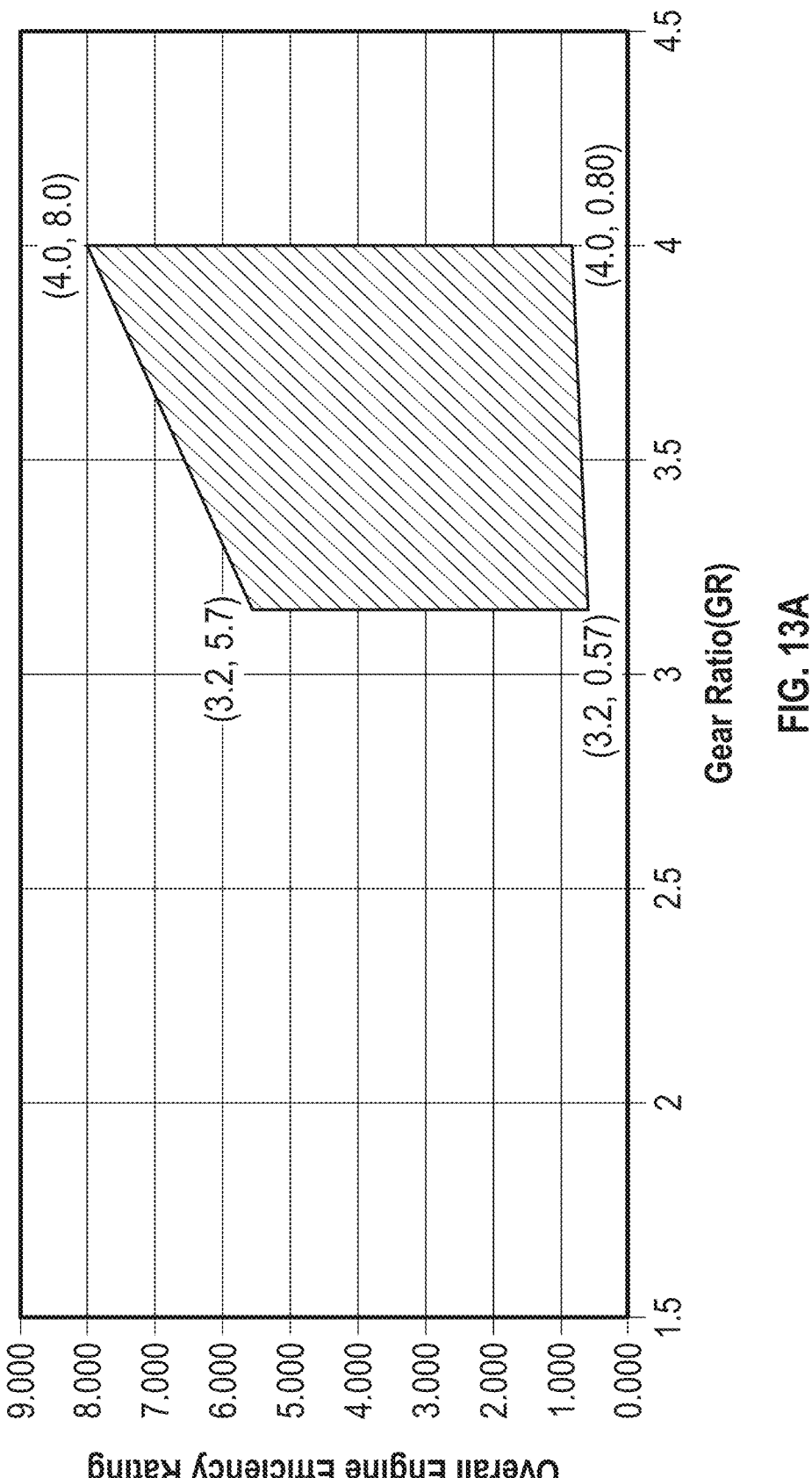
FIG. 13A is a graph depicting an exemplary range of overall engine efficiency ratings relative to an exemplary range of gear ratios for a turbomachine engine.

FIG. 13A depicts overall engine efficiency rating within a range of 0.57-8.0 for gear ratios within a range of 3.2-4.0, where the overall engine efficiency rating is greater than or equal to $0.1GR^{1.5}$ and less than or equal to $GR^{1.5}$. This range for overall engine efficiency rating and/or gear ratios may be particularly advantageous when configuring an engine to meet today and future demands, including fuel efficiency and power.

Figure 13B:
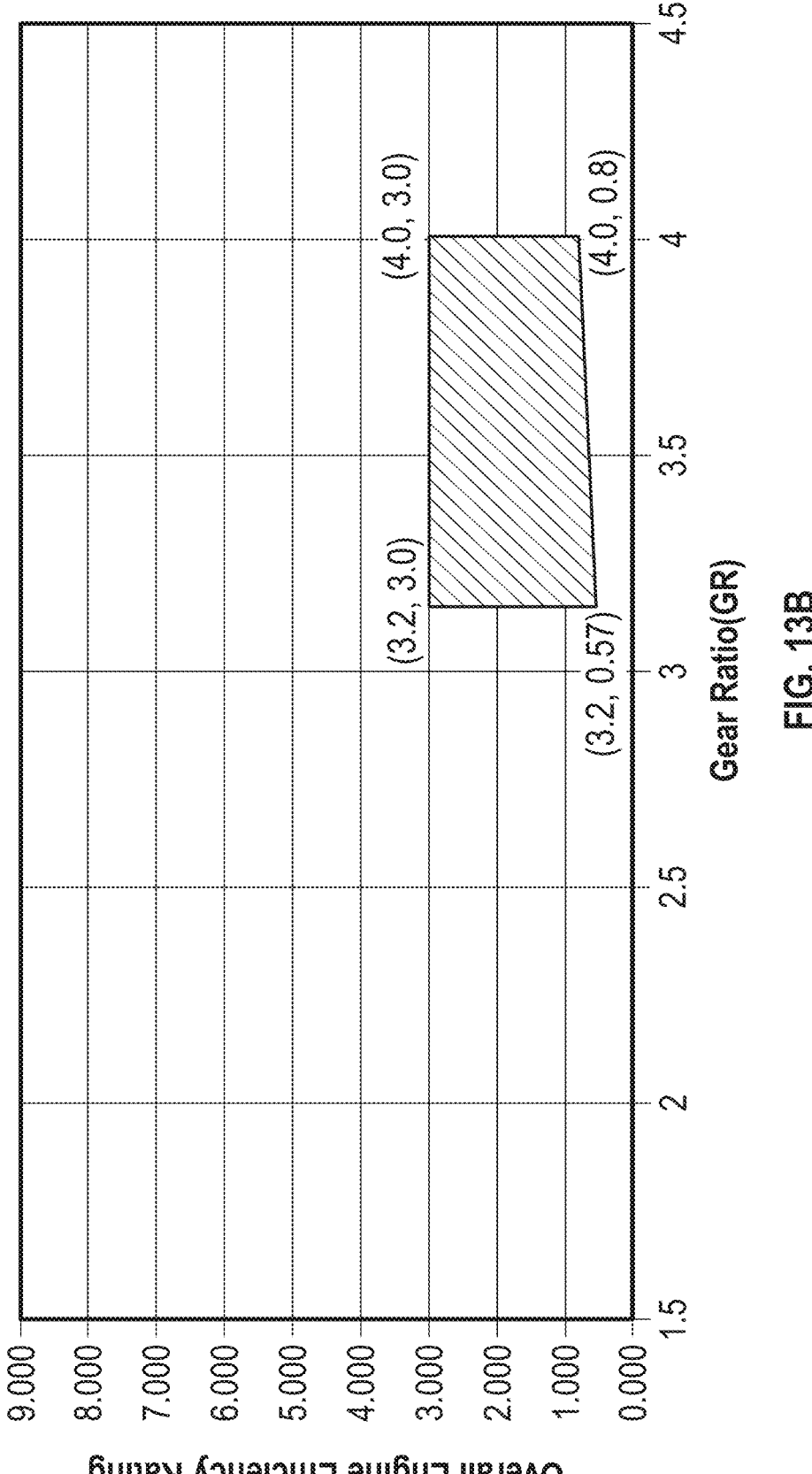
FIG. 13B is a graph depicting an exemplary range of overall engine efficiency ratings relative to an exemplary range of gear ratios for a turbomachine engine.
Figure 16A:
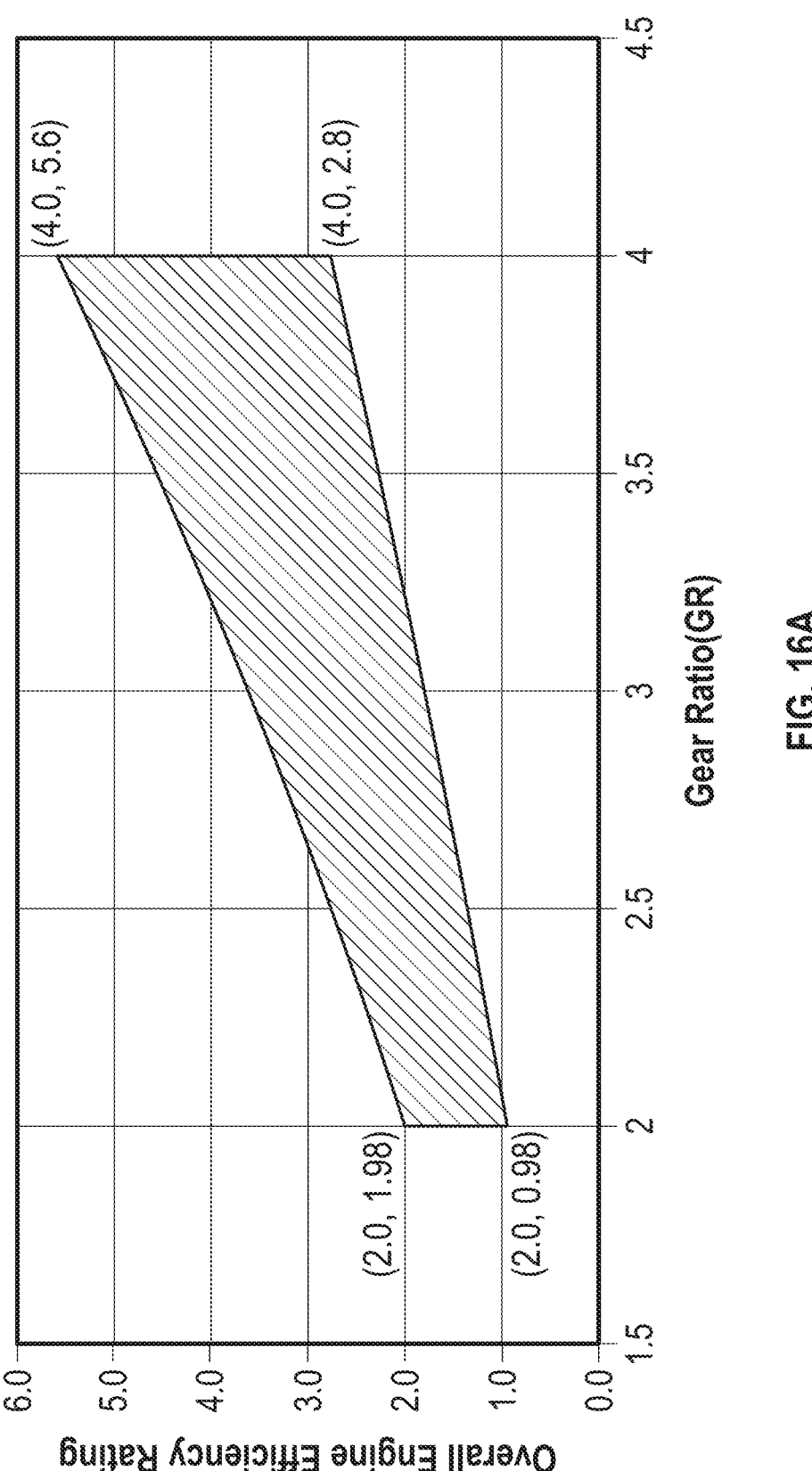
FIG. 16A is a graph depicting an exemplary range of overall engine efficiency ratings relative to an exemplary range of gear ratios for a turbomachine engine.

FIG. 13B depicts a subrange of the overall engine efficiency rating of FIG. 16A. Specifically, FIG. 13B depicts an overall engine efficiency rating of 0.57-3.0 for gear ratios of 3.2-4.0, where the overall engine efficiency rating greater than or equal to $0.1GR^{1.5}$ and less than or equal to 3.0. Configuring an engine within the subrange depicted in FIG. 13B can, for example, provide a relatively light and/or efficient engine. As another example, an engine comprising an overall engine efficiency rating within the subrange of FIG. 13B can be relatively compact, which can be advantageous when sizing/space is at a premium.

Figure 13C:
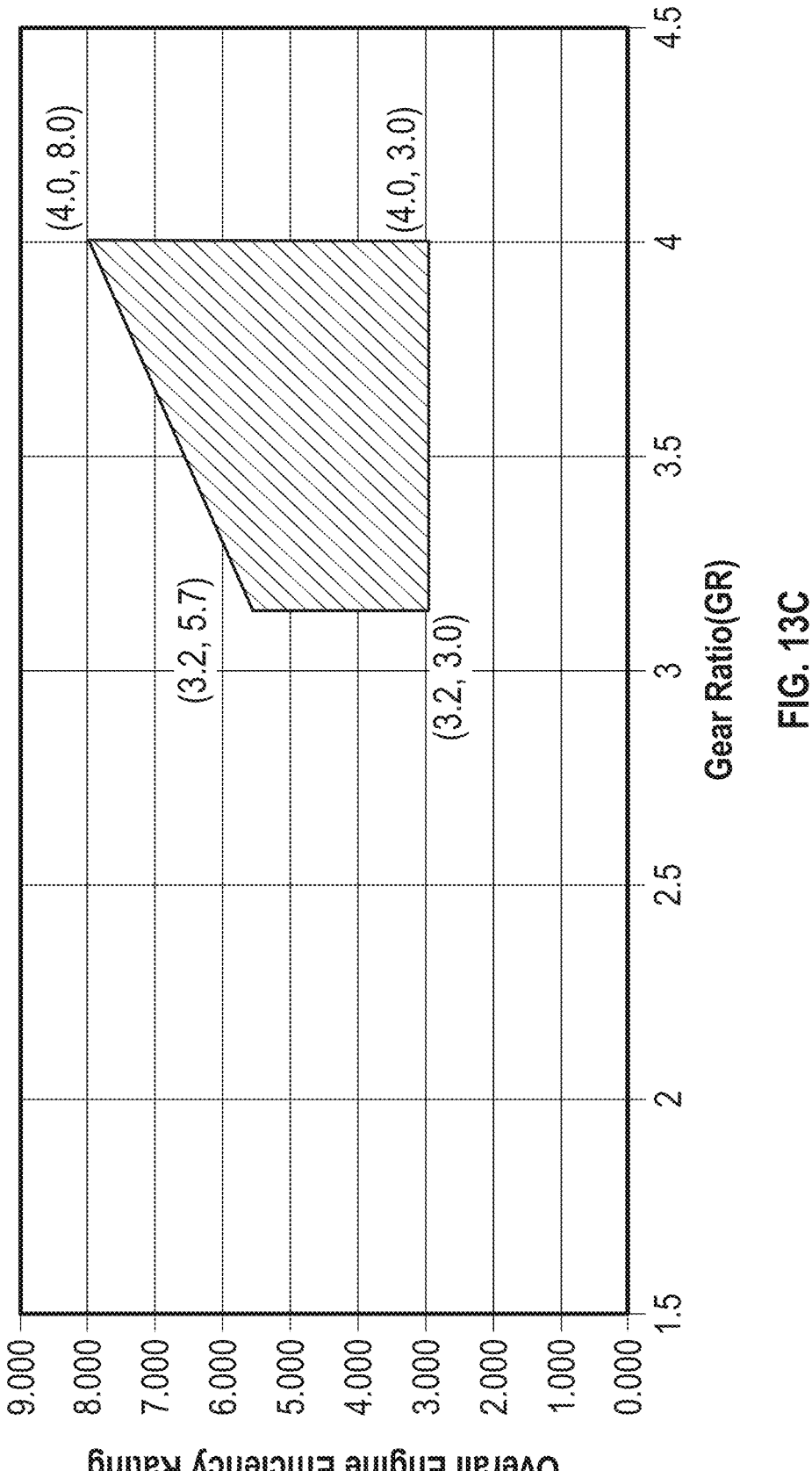
FIG. 13C is a graph depicting an exemplary range of overall engine efficiency ratings relative to an exemplary range of gear ratios for a turbomachine engine.

FIG. 13C depicts another subrange of the overall engine efficiency rating of FIG. 13A. Particularly, FIG. 13C depicts an overall engine efficiency rating within a range of 3.0-8.0 for gear ratios of 3.2-4.0, where the overall engine efficiency rating is greater than or equal to 3.0 and less than or equal to $GR^{1.5}$. Configuring an engine within the subrange depicted in FIG. 13C can, for example, provides a less costly and/or more durable engine. In particular examples, engines within the subrange depicted in FIG. 13C can have relatively higher oil flows rates than the engines within the subrange depicted in FIG. 13B. This can, among other things, reduce gearbox temperatures. As a result, less expensive materials can be used within the gearbox. Additionally (or alternatively), the durability of the gearbox can be improved and/or service intervals can be extended.

Figure 13D:
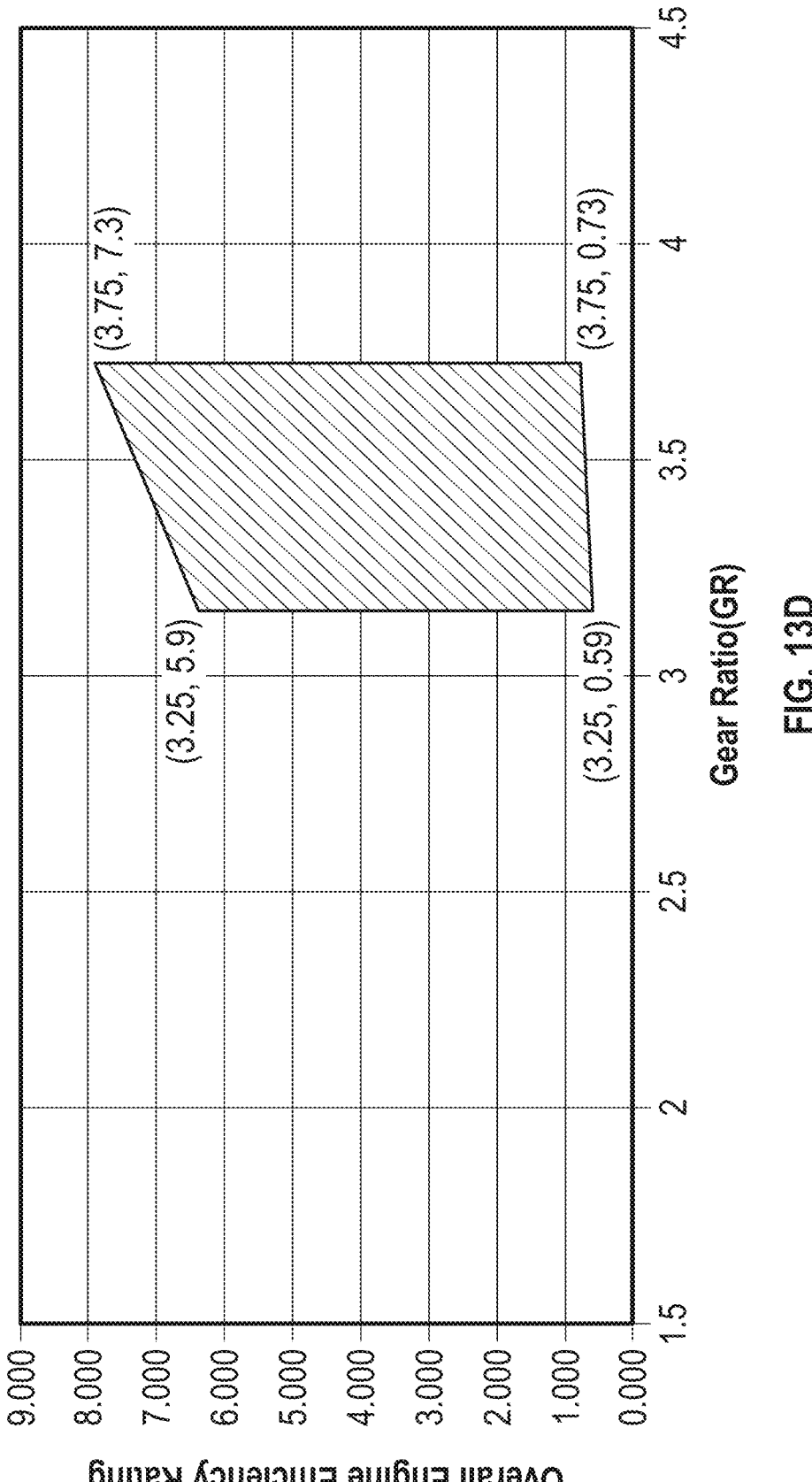
FIG. 13D is a graph depicting an exemplary range of overall engine efficiency ratings relative to an exemplary range of gear ratios for a turbomachine engine.

FIG. 13D depicts a subrange of the overall engine efficiency rating of FIG. 13A. More precisely, FIG. 13D depicts overall engine efficiency rating within a range of 0.59-7.3 for gear ratios within a range of 3.25-3.75, where the overall engine efficiency rating is greater than or equal to $0.1GR^{1.5}$ and less than or equal to $GR^{1.5}$.

Figure 14A:
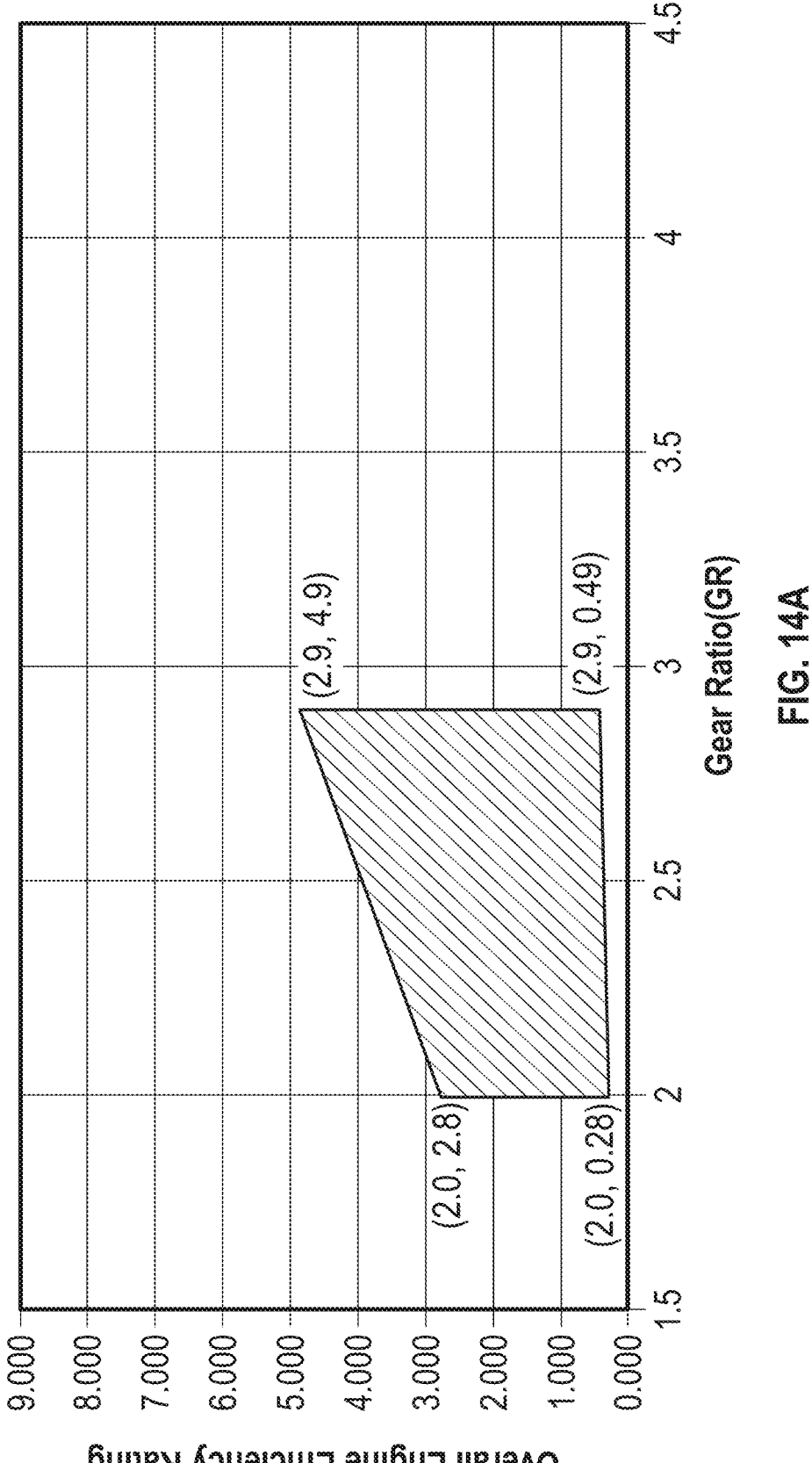
FIG. 14A is a graph depicting an exemplary range of overall engine efficiency ratings relative to an exemplary range of gear ratios for a turbomachine engine.

FIG. 14A depicts overall engine efficiency rating within a range of 0.28-4.9 for gear ratios within a range of 2.0-2.9, where the overall engine efficiency rating is greater than or equal to $0.1GR^{1.5}$ and less than or equal to $GR^{1.5}$. The range of overall engine efficiency rating depicted in FIG. 14A can, for example, be advantageous for engines comprising a counter-rotating low-pressure turbine or configurations where lower turbine speeds would produce a more efficient system due to aerodynamic or mechanical constraints.

Figure 14B:
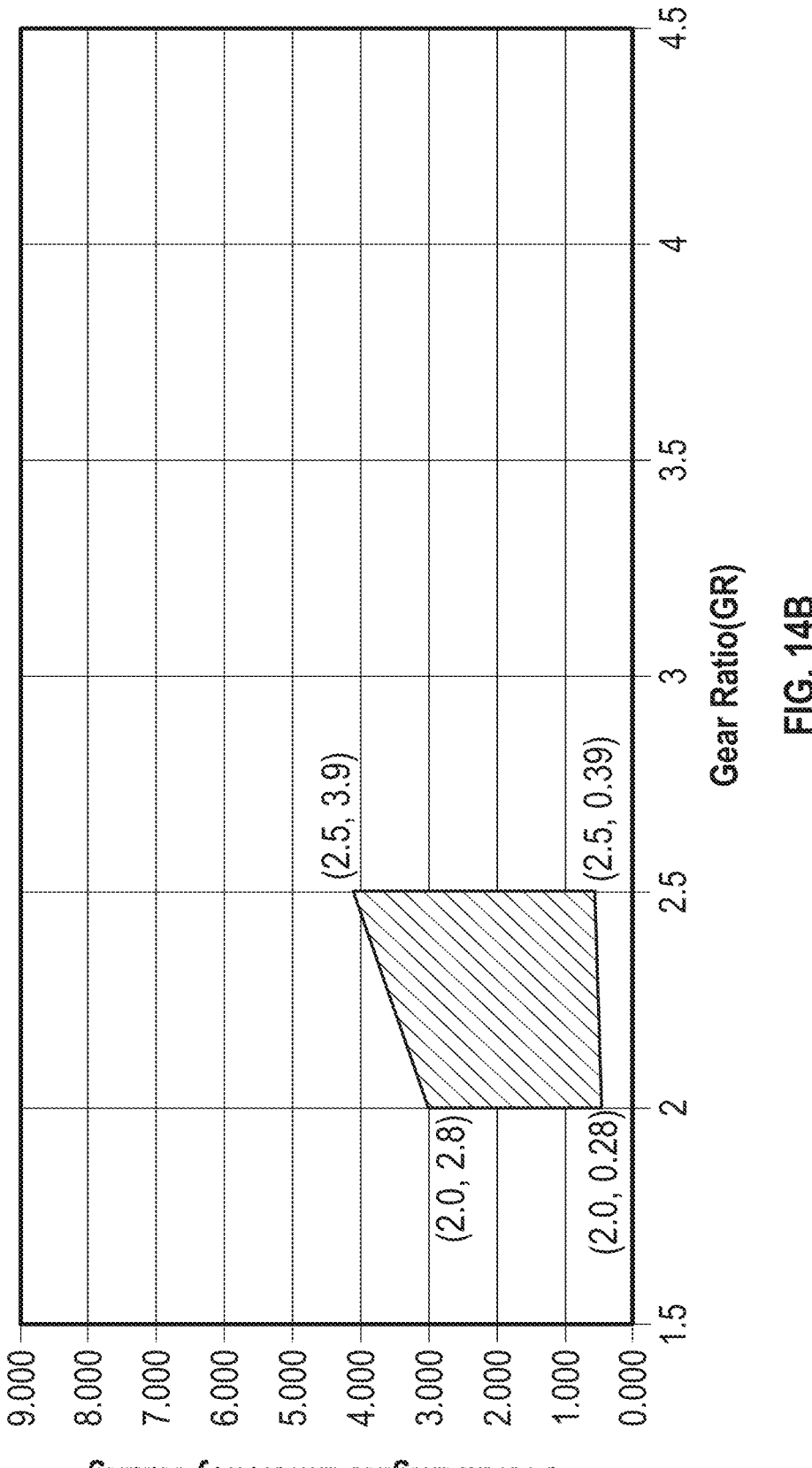
FIG. 14B is a graph depicting an exemplary range of overall engine efficiency ratings relative to an exemplary range of gear ratios for a turbomachine engine.

FIG. 14B depicts a subrange of the overall engine efficiency rating of FIG. 14A. FIG. 14B depicts overall engine efficiency rating within a range of 0.28-3.9 for gear ratios within a range of 2.0-2.5, where the overall engine efficiency rating is be greater than or equal to $0.1GR^{1.5}$ and less than or equal to $GR^{1.5}$.

Figure 14C:
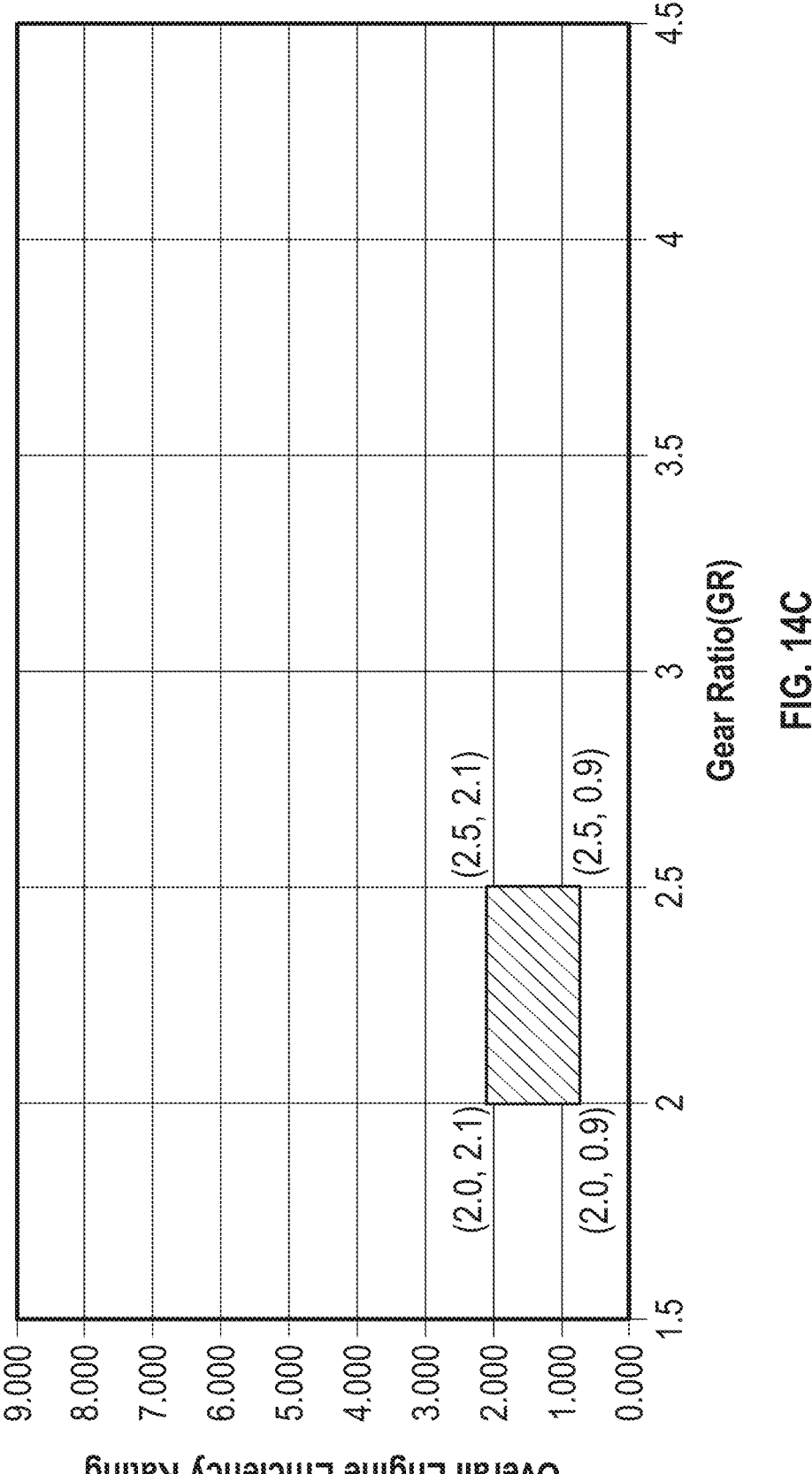
FIG. 14C is a graph depicting an exemplary range of overall engine efficiency ratings relative to an exemplary range of gear ratios for a turbomachine engine.

FIG. 14C depicts a subrange of the overall engine efficiency rating of FIG. 14A. In particular, FIG. 14C depicts overall engine efficiency rating within a range of 0.9-2.1 for gear ratios within a range of 2.0-2.5, where the overall engine efficiency rating is greater than or equal to $0.1GR^{1.5}$ and less than or equal to $GR^{1.5}$.

The overall engine efficiency ratings depicted in FIGS. 14A-14C can, in some examples, be particularly advantageous for engines comprising a counter-rotating low-pressure turbine. Specifically, the range depicted in FIG. 14C can be particularly well suited for engines comprising a counter-rotating low-pressure turbine or configurations where lower turbine speeds would produce a more efficient system due to aerodynamic or mechanical constraints.

Figure 15A:
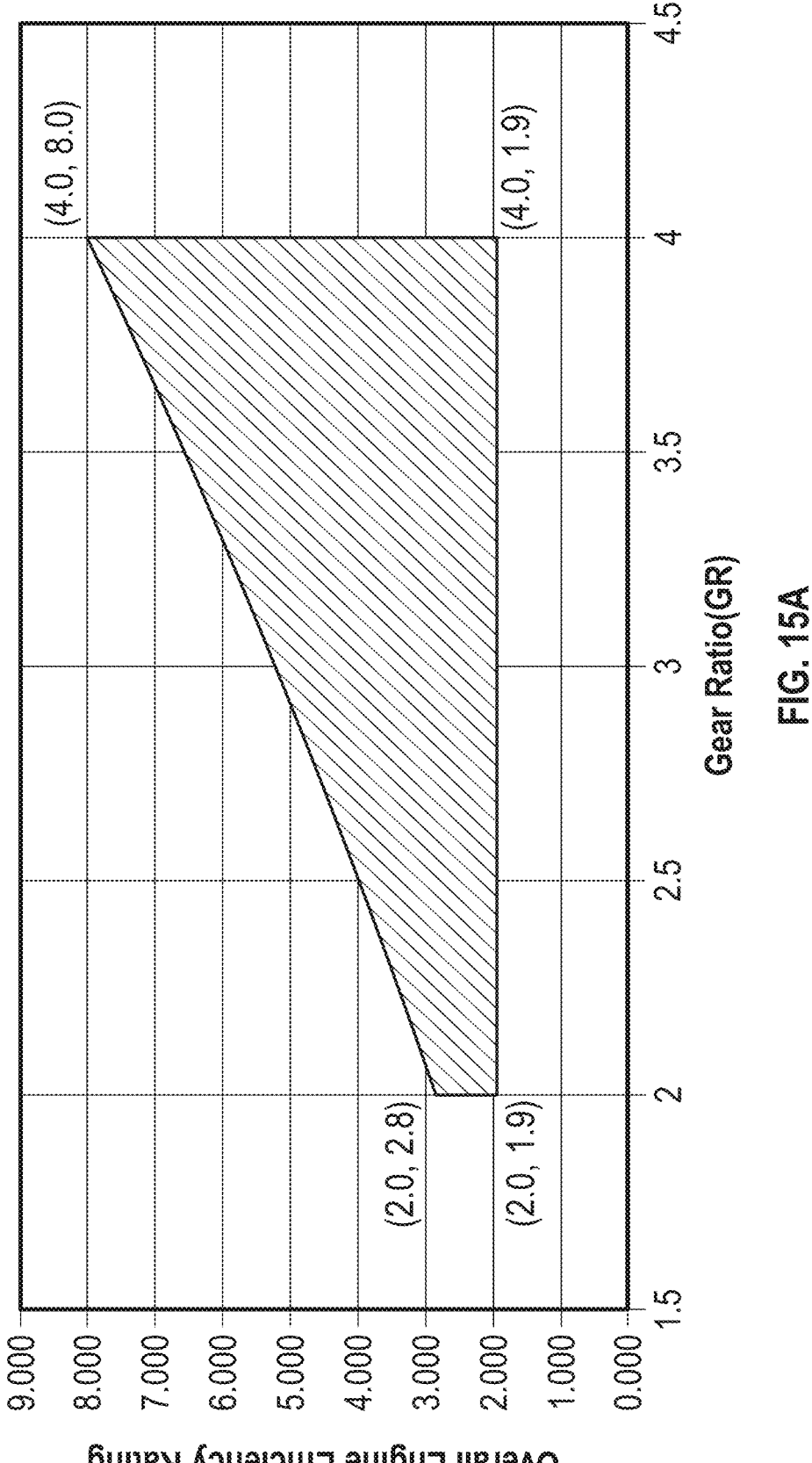
FIG. 15A is a graph depicting an exemplary range of overall engine efficiency ratings relative to an exemplary range of gear ratios for a turbomachine engine.

FIG. 15A depicts overall engine efficiency rating within a range of 1.9-8.0 for gear ratios within a range of 2.0-4.0, where the overall engine efficiency rating is greater than or equal to 1.9 and less than or equal to $GR^{1.5}$. The range depicted in FIG. 15A can, in some instances, produce an engine that is less costly and/or more durable than other geared engines having a gear ratio between 2.0 and 4.0.

Figure 15B:
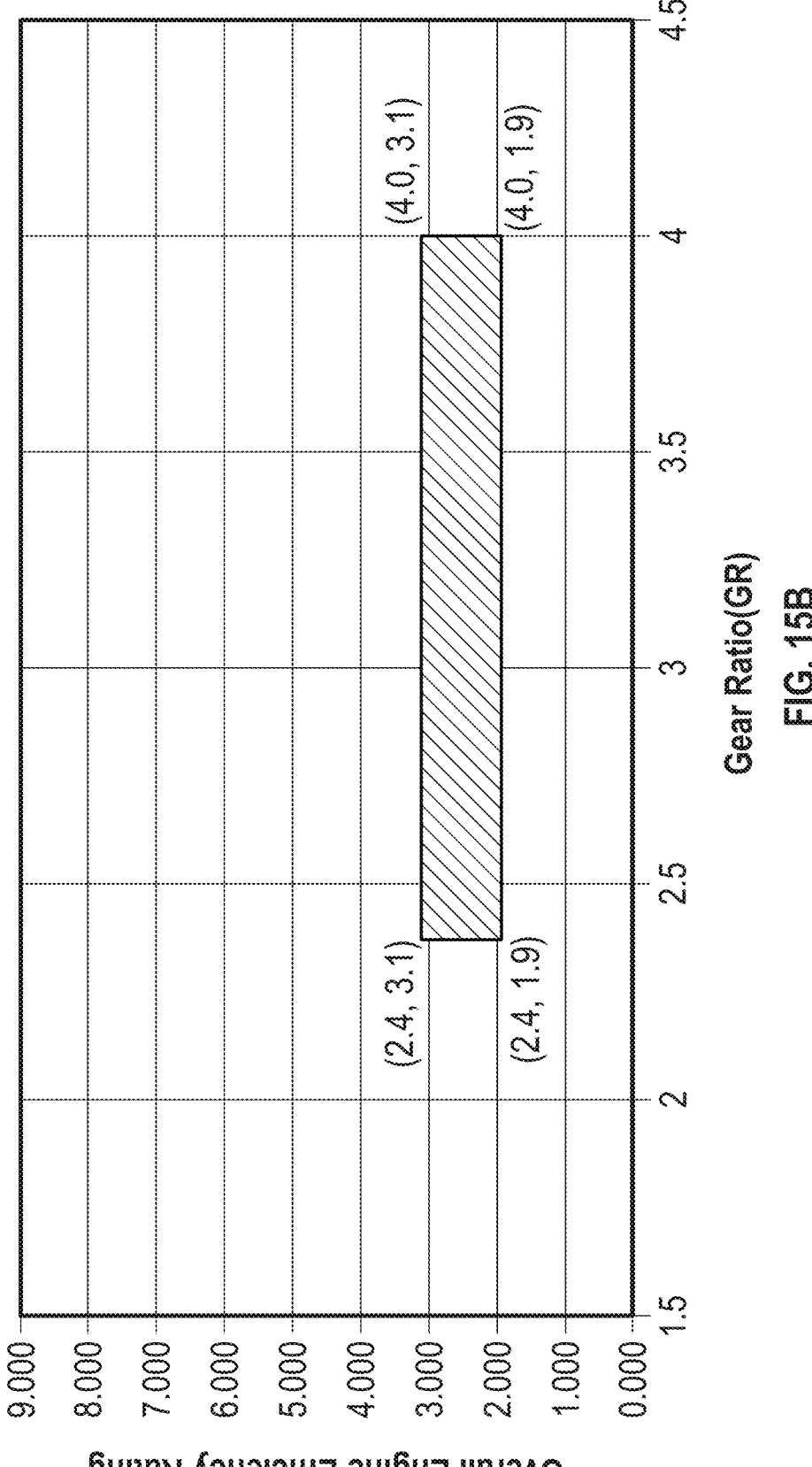
FIG. 15B is a graph depicting an exemplary range of overall engine efficiency ratings relative to an exemplary range of gear ratios for a turbomachine engine.

FIG. 15B depicts a subrange of the overall engine efficiency rating of FIG. 15A. Specifically, FIG. 15B depicts overall engine efficiency rating within a range of 1.9-3.1 for gear ratios within a range of 2.0-4.0, where the overall engine efficiency rating is greater than or equal to 1.9 and less than or equal to 3.1. The subrange range depicted in FIG. 15B can, for example, produce an engine that is well balanced and efficient. An engine configured with an overall engine efficiency rating within the subrange of FIG. 15B can, in some examples, provide a gearbox with oil flow rates that keep gearbox temperatures low enough to make the gearbox durable, while also not having excessive weight.

FIG. 16A depicts overall engine efficiency rating within a range of 0.98-5.6 for gear ratios within a range of 2.0-4.0, where the overall engine efficiency rating is greater than or equal to $0.35GR^{1.5}$ and less than or equal to $0.7GR^{1.5}$. The subrange range depicted in FIG. 16A can, for example, produce an engine that is well balanced, efficient, and cost effective.

Figure 16B:
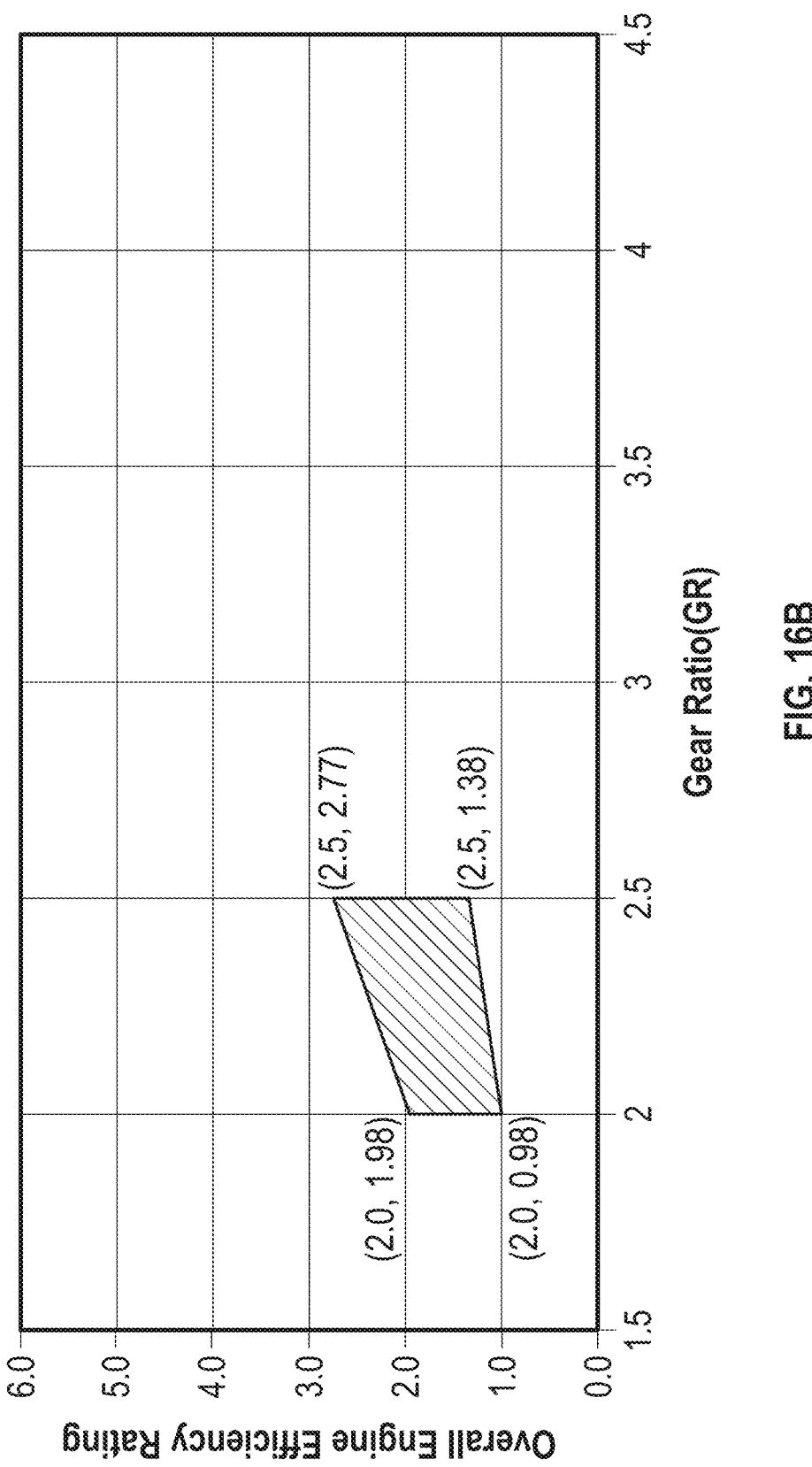
FIG. 16B is a graph depicting an exemplary range of overall engine efficiency ratings relative to an exemplary range of gear ratios for a turbomachine engine.

FIG. 16B depicts a subrange of the overall engine efficiency rating of FIG. 16A. Particularly, FIG. 16B depicts overall engine efficiency rating within a range of 0.98-2.77 for gear ratios within a range of 2.0-2.5, where the overall engine efficiency rating is greater than or equal to $0.35GR^{1.5}$ and less than or equal to $0.7GR^{1.5}$. The range depicted in FIG. 16B can be particularly well suited for engines comprising a counter-rotating low-pressure turbine or configurations where lower turbine speeds would produce a more efficient system due to aerodynamic or mechanical constraints.

Figure 16C:
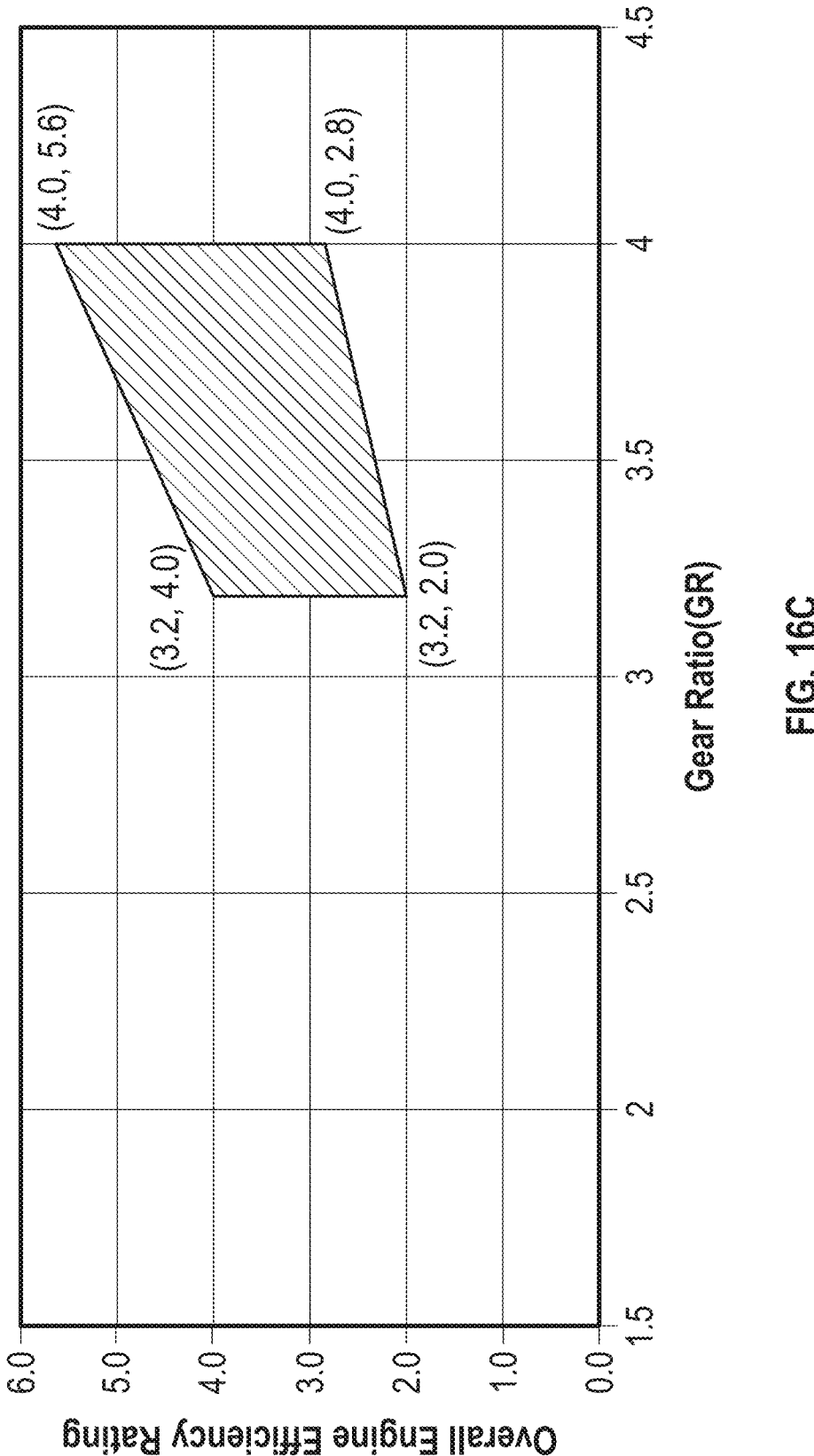
FIG. 16C is a graph depicting an exemplary range of overall engine efficiency ratings relative to an exemplary range of gear ratios for a turbomachine engine.

FIG. 16C depicts a subrange of the overall engine efficiency rating of FIG. 16A. Specifically, FIG. 16C depicts overall engine efficiency rating within a range of 2.0-5.6 for gear ratios within a range of 3.2-4.0, where the overall engine efficiency rating is greater than or equal to $0.35GR^{1.5}$ and less than or equal to $0.7GR^{1.5}$.

FIG. 17 is a table disclosing several exemplary engines and various engine parameters that fall within one or more of the overall engine efficiency rating ranges disclosed in FIGS. 13A-16C. The engines disclosed in FIG. 17 can, for example, provide a both a fuel efficient and powerful engine.

The engines disclosed herein and comprising the overall engine efficiency rating and/or the gear ratio ranges can, in some instances, comprise a three, a four, or a five stage low-pressure turbine.

This written description uses examples to disclose the technology, including the best mode, and also to enable any person skilled in the art to practice the disclosed technology, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

1. A gas turbine engine comprising: a core turbine engine comprising a low pressure turbine; a gearbox assembly coupled to the low pressure turbine, the gearbox including an input and an output, wherein the input is coupled to the one or more turbine sections of the core engine and comprises a first rotational speed, wherein the output is coupled to the fan assembly and has a second rotational speed, and wherein a gear ratio of the first rotational speed to the second rotational speed is within a range of 4.1-7.0; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; an inlet-to-nacelle (ITN) ratio defined as a ratio of the inlet length to a maximum diameter of the nacelle, and a gearbox efficiency rating of 0.10-0.70, wherein the gearbox efficiency rating equals $$Q\left(\frac{D^{1.56}}{T}\right)^{1.53},$$

wherein Q is a gearbox oil flow rate at an inlet of the gearbox measured in gallons per minute at a max takeoff condition, wherein D is a diameter of the fan blades measured in inches, and wherein T is a net thrust of the gas turbine engine measured in pounds force at the max takeoff condition, wherein the ASR of the gas turbine engine is 1.5 to 16.0, and the ITN ratio is 0.23 to 0.35.

2. The gas turbine engine of any example herein, wherein the gearbox efficiency rating is 0.10-0.62.

3. The gas turbine engine of any example herein, wherein the gearbox efficiency rating is 0.21-0.51.

4. The gas turbine engine of any example herein, wherein the gear ratio is within a range of 4.1-7.0.

5. The gas turbine engine of any example herein, wherein the gear ratio is within a range of 4.1-5.1.

6. The gas turbine engine of any example herein, wherein Q is within a range of 6-36 gallons per minute.

7. The gas turbine engine of any example herein, wherein T is within a range of 12,000-30,000 pounds force.

8. The gas turbine engine of any example herein, wherein the gearbox is an epicyclic gearbox comprising a sun gear, a plurality of planet gears, and a ring gear, wherein the sun gear is the input, and wherein the ring gear is the output.

9. The gas turbine engine of any example herein, wherein the gearbox is an epicyclic gearbox comprising a sun gear, a plurality of planet gears, and a ring gear, wherein the sun gear is the input, wherein the planet gears are coupled to a planet carrier, and wherein the planet carrier is the output.

10. The gas turbine engine of any example herein, further comprising a fan pressure ratio from 1.30 to 1.55.

11. The gas turbine engine of any example herein, wherein the ASR is 4.0 to 14.0.

12. The gas turbine engine of any example herein, wherein the ASR is 6.6 to 13.5.

13. A gas turbine engine comprising: a core turbine engine comprising a low pressure turbine; a gearbox assembly coupled to the low pressure turbine, the gearbox including an input and an output, wherein the input is coupled to the one or more turbine sections of the core engine and comprises a first rotational speed, wherein the output is coupled to the fan assembly and has a second rotational speed, and wherein a gear ratio of the first rotational speed to the second rotational speed is within a range of 3.2-4.0; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; an inlet-to-nacelle (ITN) ratio defined as a ratio of the inlet length to a maximum diameter of the nacelle; and an overall engine efficiency rating within a range of 0.57-8.0, wherein the overall engine efficiency rating equals $$Q\left(\frac{D^{1.56}}{T}\right)^{1.53} N^2,$$

wherein Q is a gearbox oil flow rate at an inlet of the gearbox measured in gallons per minute at a max takeoff condition, wherein D is a diameter of the fan blades measured in inches, wherein T is a net thrust of the gas turbine engine measured in pounds force at the max takeoff condition, and wherein N is a number of rotating blade stages of the low-pressure turbine, wherein the ASR of the gas turbine engine is 1.5 to 16.0, and the ITN ratio is 0.23 to 0.35.

14. The gas turbine engine of any example herein, wherein the overall engine efficiency rating is within a range of 0.57-3.0.

15. The gas turbine engine of any example herein, wherein the overall engine efficiency rating is within a range of 3.0-8.0.

16. The gas turbine engine of any example herein, wherein the gear ratio is within a range of 3.25-3.75.

17. The gas turbine engine of any example herein, wherein the overall engine efficiency rating is within a range of 0.59-7.3.

18. The gas turbine engine of any example herein, wherein the low-pressure turbine includes exactly three stages.

19. The gas turbine engine of any example herein, wherein the low-pressure turbine includes exactly four stages.

20. The gas turbine engine of any example herein, wherein the low-pressure turbine includes exactly five stages.

21. A gas turbine engine comprising a core turbine engine comprising a low pressure turbine; a gearbox assembly including an input and an output, wherein the input is coupled to the low pressure turbine of the core engine and comprises a first rotational speed, wherein the output is coupled to a fan assembly and has a second rotational speed, and wherein a gear ratio (GR) of the first rotational speed to the second rotational speed is within a range of 2.5-5.0; a fan coupled to the gearbox assembly and having a fan diameter and a plurality of fan blades with a blade solidity that is greater than or equal to 0.8 and less than or equal to 2.0; a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan, $\gamma$ is a stagger angle of the fan blade, and $N_b$ is the number of the plurality of fan blades; a nacelle that includes a fan case that surrounds the fan, the fan case comprising an inlet disposed forward of the fan and an inlet length, wherein the inlet length is an axial distance between a leading edge of one of the plurality of fan blades and the inlet, as measured at a 75% span position of the fan blade; a plurality of outlet guide vanes disposed aft of the fan and extending radially between the core turbine engine and the fan case; an acoustic spacing from the fan blade trailing edge to an outlet guide vane leading edge; an acoustic spacing ratio (ASR) defined as:

$$ASR = \frac{1}{\left(\frac{Nv}{Nb}\right)} \cdot \frac{As}{BEAL}$$

wherein As is the acoustic spacing and Nv is the number of the plurality of outlet guide vanes; an inlet-to-nacelle (ITN) ratio defined as a ratio of the inlet length to a maximum diameter of the nacelle; and a net thrust (T) of the gas turbine engine measured in pounds force at the max takeoff condition, wherein $$\frac{0.1\left(GR^{1.5}\right)}{\left(\frac{D^{1.56}}{T}\right)^{1.53} N^2} > 3,$$

wherein $$\frac{GR^{1.5}}{\left(\frac{D^{1.56}}{T}\right)^{1.53} N^2} < 99,$$

wherein the gas turbine engine defines a redline exhaust gas temperature (EGT) in degrees Celsius, a total sea level static thrust output ($Fn_{Total}$) in pounds, and a corrected specific thrust, wherein the corrected specific thrust is greater than or equal to 42 and less than or equal to 90, the corrected specific thrust determined as follows: $Fn_{Total} \times EGT/(A_{HPCExit}^2 \times 1000)$, and wherein the ASR of the gas turbine engine is 1.5 to 16.0, and the ITN ratio is 0.23 to 0.35.

In view of the many possible examples to which the principles of the disclosure may be applied, it should be recognized that the illustrated examples are only preferred examples and should not be taken as limiting the scope. Rather, the scope is defined by the following claims. We therefore claim all that comes within the scope and spirit of these claims.

We claim:
1. A gas turbine engine comprising:
a core engine comprising a low-pressure turbine;
a gearbox assembly including an input and an output, wherein the input is coupled to the low-pressure turbine and comprises a first rotational speed, wherein the output is coupled to a fan assembly and has a second rotational speed, and wherein a gear ratio (GR) of the first rotational speed to the second rotational speed is within a range of 4.1-7.0;
the fan assembly comprising a plurality of fan blades made from a composite material and having a blade solidity that is greater than or equal to 0.8 and less than or equal to 2.0;
a blade effective acoustic length (BEAL) defined as:

$$BEAL = \frac{2c^2}{S(1-rr)N_b}\cos(\gamma)$$

wherein c is a chord length of a fan blade of the plurality of fan blades, S is a span of the fan blade, rr is a radius ratio of the fan assembly, $\gamma$ is a stagger angle of the fan blade, and $N_b$ is the number of fan blades;

a nacelle that includes a fan case that surrounds the fan assembly;

a plurality of outlet guide vanes disposed aft of the fan assembly and extending radially between the core engine and the fan case;

an acoustic spacing (As) from the fan blade trailing edge to an outlet guide vane leading edge measured parallel to a central longitudinal axis of the core engine; an acoustic spacing ratio (ASR) defined as:

$$ASR = \frac{1}{\left(\frac{Nv}{Nb}\right)} \cdot \frac{As}{BEAL}$$

wherein Nv is the number of the outlet guide vanes;
a gearbox efficiency rating of 0.10-0.70, wherein the gearbox efficiency rating equals $$Q\left(\frac{D^{1.56}}{T}\right)^{1.53},$$

wherein Q is a gearbox oil flow rate at an inlet of the gearbox assembly measured in gallons per minute at a max takeoff condition, wherein D is a diameter of the fan blades measured in inches, and wherein T is a net thrust of the gas turbine engine measured in pounds force at the max takeoff condition, wherein the ASR of the gas turbine engine is 1.5 to 16.0.

2. The gas turbine engine of claim 1, wherein the ASR range of 1.5 to 16.0 mitigates an increase in acoustic noise that results from increased propulsive power by the gearbox efficiency rating of 0.10-0.70.

3. The gas turbine engine of claim 1, wherein the gearbox efficiency rating is 0.10-0.62.

4. The gas turbine engine of claim 1, wherein the gearbox efficiency rating is 0.21-0.51.

5. The gas turbine engine of claim 1, wherein the gear ratio is within a range of 4.1-5.1.

6. The gas turbine engine of claim 1, wherein Q is within a range of 6-36 gallons per minute.

7. The gas turbine engine of claim 1, wherein T is within a range of 12,000-30,000 pounds force.

8. The gas turbine engine of claim 1, wherein the gearbox assembly is an epicyclic gearbox comprising a sun gear, a plurality of planet gears, and a ring gear, wherein the sun gear is the input, and wherein the ring gear is the output.

9. The gas turbine engine of claim 1, wherein the gearbox assembly is an epicyclic gearbox comprising a sun gear, a plurality of planet gears, and a ring gear, wherein the sun gear is the input, wherein the planet gears are coupled to a planet carrier, and wherein the planet carrier is the output.

10. The gas turbine engine of claim 1, further comprising a fan pressure ratio from 1.30 to 1.55.

11. The gas turbine engine of claim 1, wherein the ASR is 4.0 to 14.0.

12. The gas turbine engine of claim 1, wherein the ASR is 6.6 to 13.5.

13. The gas turbine engine of claim 12, further comprising a disk-to-nacelle diametric (DND) ratio defined as a ratio of a disk spacing length to the fan diameter, the disk spacing length being a distance between a forwardmost end of a fan disk and an intersection with the inlet taken along an engine centerline, wherein the DND ratio of the gas turbine engine is 0.07 to 0.47.

14. The gas turbine engine of claim 13, wherein the DND ratio of the gas turbine engine is 0.15 to 0.35.

15. The gas turbine engine of claim 13, wherein the DND ratio of the gas turbine engine is 0.15 to 0.25.

16. The gas turbine engine of claim 1, wherein the fan case comprises an inlet disposed forward of the fan assembly and an inlet length, wherein the inlet length is an axial distance between a leading edge of one of the plurality of fan blades and the inlet as measured at a 75% span position of the fan blade, and wherein the gas turbine engine further comprises a disk-to-inlet length (DIL) ratio defined as a ratio of a disk spacing length to the inlet length, the disk spacing length being a distance between a forwardmost end of a fan disk and an intersection with the inlet taken along an engine centerline, wherein the DIL ratio of the gas turbine engine is 0.30 to 0.80.

17. The gas turbine engine of claim 16, wherein the DIL ratio of the gas turbine engine is 0.30 to 0.70.

18. The gas turbine engine of claim 16, wherein the DIL ratio of the gas turbine engine is 0.49 to 0.65.

19. The gas turbine engine of claim 16, further comprising a fan pressure ratio from 1.25 to 1.45.

20. The gas turbine engine of claim 1, wherein the fan case comprises an inlet disposed forward of the fan assembly and an inlet length, wherein the inlet length is an axial distance between a leading edge of one of the plurality of fan blades and the inlet as measured at a 75% span position of the fan blade, wherein the gas turbine engine further comprises an inlet-to-nacelle (ITN) ratio defined as a ratio of the inlet length to a maximum diameter of the nacelle, and wherein the ITN ratio is 0.23 to 0.35.

\* \* \* \* \*